US010681436B2

(12) United States Patent
Wright et al.

(10) Patent No.: US 10,681,436 B2
(45) Date of Patent: Jun. 9, 2020

(54) WATERPROOF CASE

(71) Applicant: CATALYST LIFESTYLE LIMITED, North Point (HK)

(72) Inventors: Joshua Wright, Hong Kong (CN); June Lai, Hong Kong (CN)

(73) Assignee: CATALYST LIFESTYLE LIMITED, North Point (HK)

( * ) Notice: Subject to any disclaimer, the term of this patent is extended or adjusted under 35 U.S.C. 154(b) by 0 days.

(21) Appl. No.: 16/283,026

(22) Filed: Feb. 22, 2019

(65) Prior Publication Data
US 2019/0191234 A1  Jun. 20, 2019

Related U.S. Application Data

(63) Continuation of application No. 15/692,786, filed on Aug. 31, 2017, now Pat. No. 10,219,056, which is a continuation of application No. 13/591,944, filed on Aug. 22, 2012, now Pat. No. 9,800,962.

(60) Provisional application No. 61/526,093, filed on Aug. 22, 2011.

(51) Int. Cl.
H04R 1/02 (2006.01)
G06F 1/18 (2006.01)
G06F 1/16 (2006.01)
H04M 1/18 (2006.01)

(52) U.S. Cl.
CPC ............ H04R 1/02 (2013.01); G06F 1/1626 (2013.01); G06F 1/1688 (2013.01); G06F 1/182 (2013.01); H04M 1/185 (2013.01); G06F 2200/1633 (2013.01); H04R 2499/11 (2013.01)

(58) Field of Classification Search
CPC .... G06F 1/1688; G06F 1/169; H04R 2499/11
USPC ................................. 206/320; 224/412, 929
See application file for complete search history.

(56) References Cited

U.S. PATENT DOCUMENTS

| 6,068,119 | A | 5/2000 | Derr et al. |
|---|---|---|---|
| 6,349,824 | B1 | 2/2002 | Yamada |
| 6,468,619 | B1 | 10/2002 | Larroche |
| 6,568,619 | B1 | 5/2003 | Shiga et al. |
| 6,646,864 | B2 | 11/2003 | Richardson |
| 6,995,976 | B2 | 2/2006 | Richardson |

(Continued)

FOREIGN PATENT DOCUMENTS

| CN | 201042019 Y | 3/2008 |
|---|---|---|
| CN | 201639626 U | 11/2010 |

(Continued)

OTHER PUBLICATIONS

International Search Report, International Application No. PCT/IB32012/002187, 6 pages.

(Continued)

Primary Examiner — Anthony D Stashick
Assistant Examiner — Raven Collins
(74) Attorney, Agent, or Firm — Dinsmore & Shohl LLP

(57) ABSTRACT

A protective case for an electronic device includes a main housing and a lid. The main housing and lid are removably joined to define an air and water tight volume receiving an electronic device. The electronic device includes a switch. The main housing includes a slot formed therein proximate the switch of the electronic device. The main housing includes a pair of separated raised walls formed thereon about the slot. A toggle is rotatively positioned within the slot and between the raised walls.

6 Claims, 27 Drawing Sheets

(56) References Cited

U.S. PATENT DOCUMENTS

| | | |
|---|---|---|
| 7,180,735 B2 | 2/2007 | Thomas et al. |
| 7,230,823 B2 | 6/2007 | Richardson et al. |
| 7,312,984 B2 | 12/2007 | Richardson et al. |
| 7,449,650 B2 | 11/2008 | Richardson et al. |
| 7,609,512 B2 | 10/2009 | Richardson et al. |
| 7,663,879 B2 | 2/2010 | Richardson et al. |
| 7,688,580 B2 | 3/2010 | Richardson et al. |
| 7,889,489 B2 | 2/2011 | Richardson et al. |
| 7,907,394 B2 | 3/2011 | Richardson et al. |
| 7,933,122 B2 | 4/2011 | Richardson et al. |
| 8,045,323 B2 | 10/2011 | Murakata |
| D670,280 S | 11/2012 | Rayner |
| 8,457,701 B2 | 6/2013 | Diebel |
| 2003/0111366 A1 | 6/2003 | Enners |
| 2004/0173402 A1 | 9/2004 | Morkerken |
| 2005/0067216 A1 | 3/2005 | Schuhmann et al. |
| 2006/0279924 A1 | 12/2006 | Richardson et al. |
| 2007/0087640 A1 | 4/2007 | Albertone et al. |
| 2007/0139873 A1 | 6/2007 | Thomas et al. |
| 2007/0297149 A1 | 12/2007 | Richardson et al. |
| 2008/0068934 A1* | 3/2008 | Hiranuma ............ G04B 3/043 368/288 |
| 2008/0192114 A1 | 8/2008 | Pearson et al. |
| 2008/0298026 A1 | 12/2008 | Wang et al. |
| 2009/0080153 A1 | 3/2009 | Richardson et al. |
| 2010/0008028 A1 | 1/2010 | Richardson et al. |
| 2010/0104814 A1 | 4/2010 | Richardson et al. |
| 2010/0147737 A1 | 6/2010 | Richardson et al. |
| 2010/0200456 A1 | 8/2010 | Parkinson |
| 2010/0298025 A1 | 11/2010 | Spence |
| 2011/0003213 A1 | 1/2011 | Burchardt et al. |
| 2011/0073608 A1 | 3/2011 | Richardson et al. |
| 2011/0139643 A1 | 6/2011 | Elenes |
| 2011/0143114 A1 | 6/2011 | Horie et al. |
| 2011/0182463 A1 | 7/2011 | Lee |
| 2011/0226545 A1 | 9/2011 | Richardson et al. |
| 2011/0228458 A1 | 9/2011 | Richardson et al. |
| 2011/0228459 A1 | 9/2011 | Richardson et al. |
| 2012/0018323 A1 | 1/2012 | Johnson et al. |
| 2012/0031914 A1 | 2/2012 | Liu |
| 2012/0043235 A1 | 2/2012 | Klement |
| 2012/0074005 A1 | 3/2012 | Johnson et al. |
| 2012/0118773 A1* | 5/2012 | Rayner ............ G06F 1/1626 206/320 |
| 2012/0211382 A1 | 8/2012 | Rayner |
| 2012/0261306 A1 | 10/2012 | Richardson et al. |
| 2012/0325723 A1 | 12/2012 | Carnevali |
| 2013/0255198 A1 | 10/2013 | Guschke et al. |
| 2013/0264143 A1 | 10/2013 | Richardson et al. |

FOREIGN PATENT DOCUMENTS

| | | | |
|---|---|---|---|
| CN | 201639626 U | | 11/2010 |
| CN | 102123863 A | | 7/2011 |
| CN | 202455520 U | | 9/2012 |
| JP | 8046371 A | | 2/1996 |
| JP | 9023072 A | | 1/1997 |
| JP | 3044740 U | | 1/1998 |
| JP | 10079582 A | | 3/1998 |
| JP | 11231970 A | | 8/1999 |
| JP | 11231973 A | | 8/1999 |
| JP | 11284358 A | | 10/1999 |
| JP | 2000125916 A | | 5/2000 |
| JP | 2003324796 A | | 11/2003 |
| JP | 2006064998 | * | 8/2004 |
| JP | 20040247297 A | | 9/2004 |
| JP | 2006064998 A | | 3/2006 |
| WO | 2012/051358 A2 | | 4/2012 |

OTHER PUBLICATIONS

International Search Report and Written Opinion for PCT/US2014/010524, dated Jul. 3, 2014.

International Search Report for International App. No. PCT/US2014/010524, five pages.

Int'l Search Report for EP18175763.4, dated Nov. 11, 2018.

Extended European Search Report; Application No. EP18175763.4 dated Nov. 6, 2018.

Anonymous: "[Review] the Newest Waterproof Case on the Market: Introducing the Ecape Capsule . . . l i PhoneLife.com," i Phone + i Pad Life Magazine Nov. 6, 2012 (Nov. 6, 2012), XP055292666, Retrieved from the Internet: URP:http://www.iphonelife.com/blog/28861/review-newest-waterproof-case-market-introducing-escape-capsile [retrieved on Aug. 2, 2016].

* cited by examiner

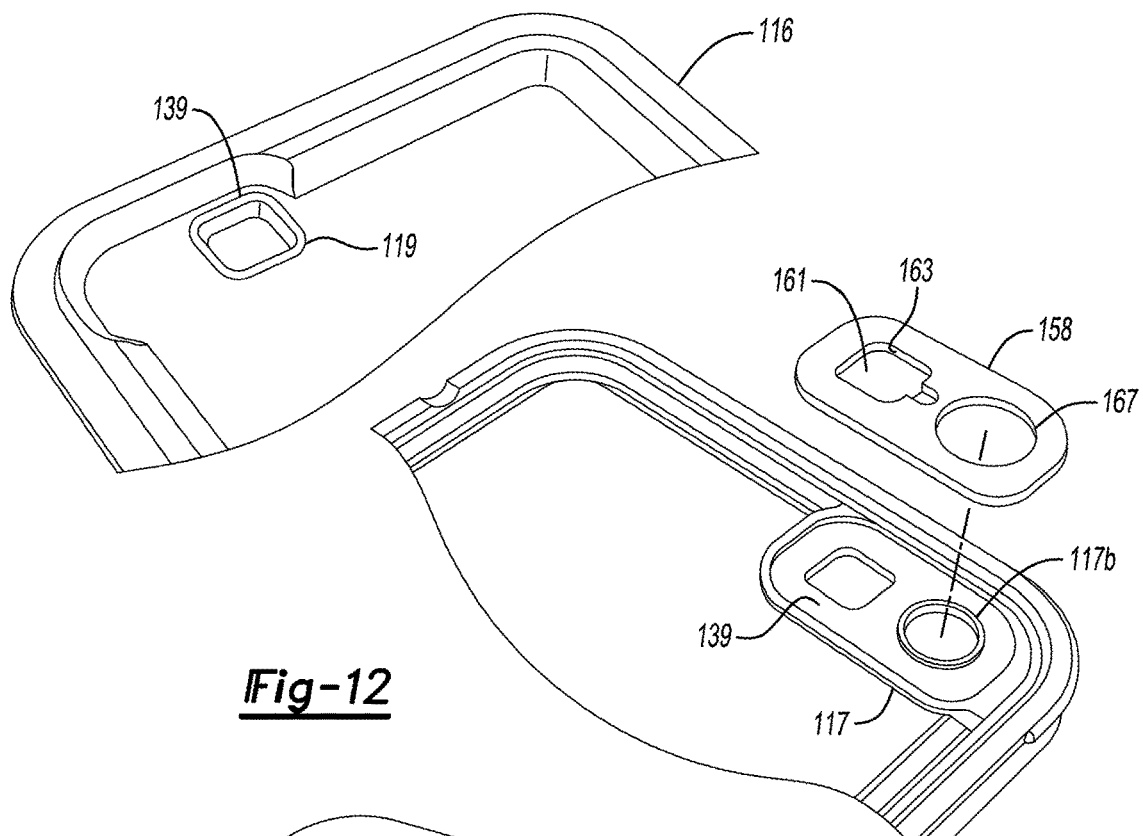
_Fig-12_
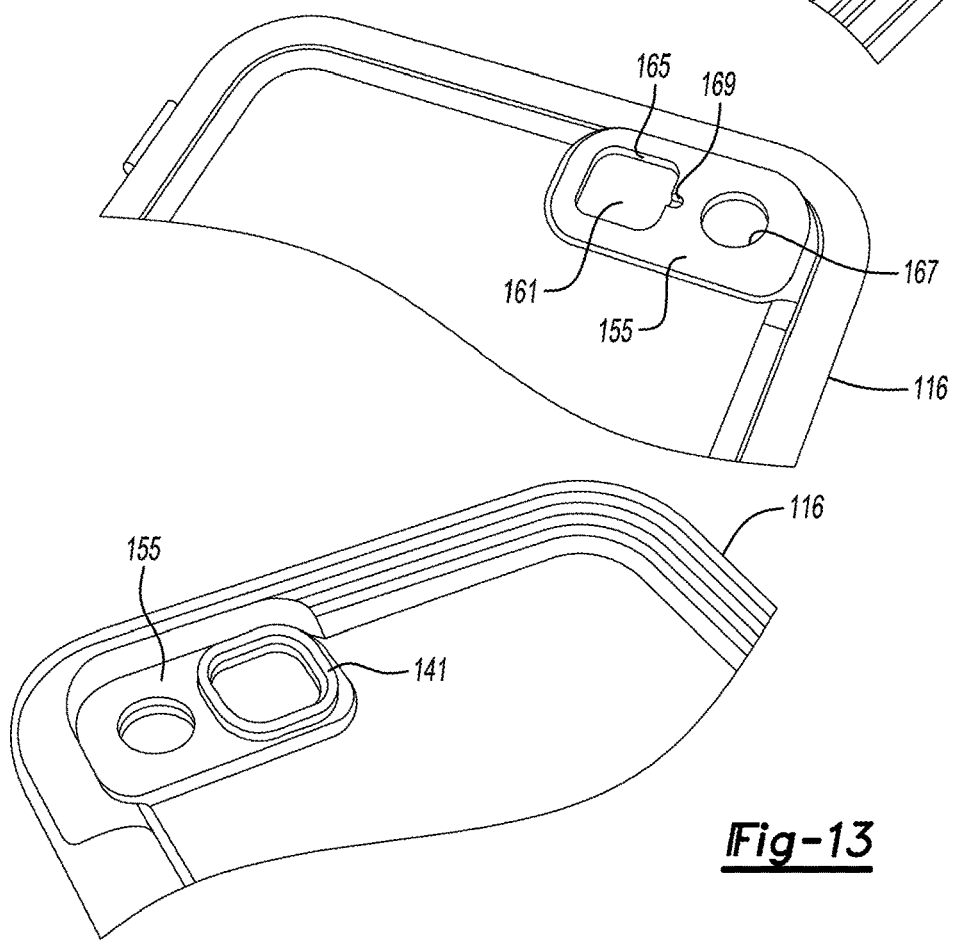
_Fig-13_

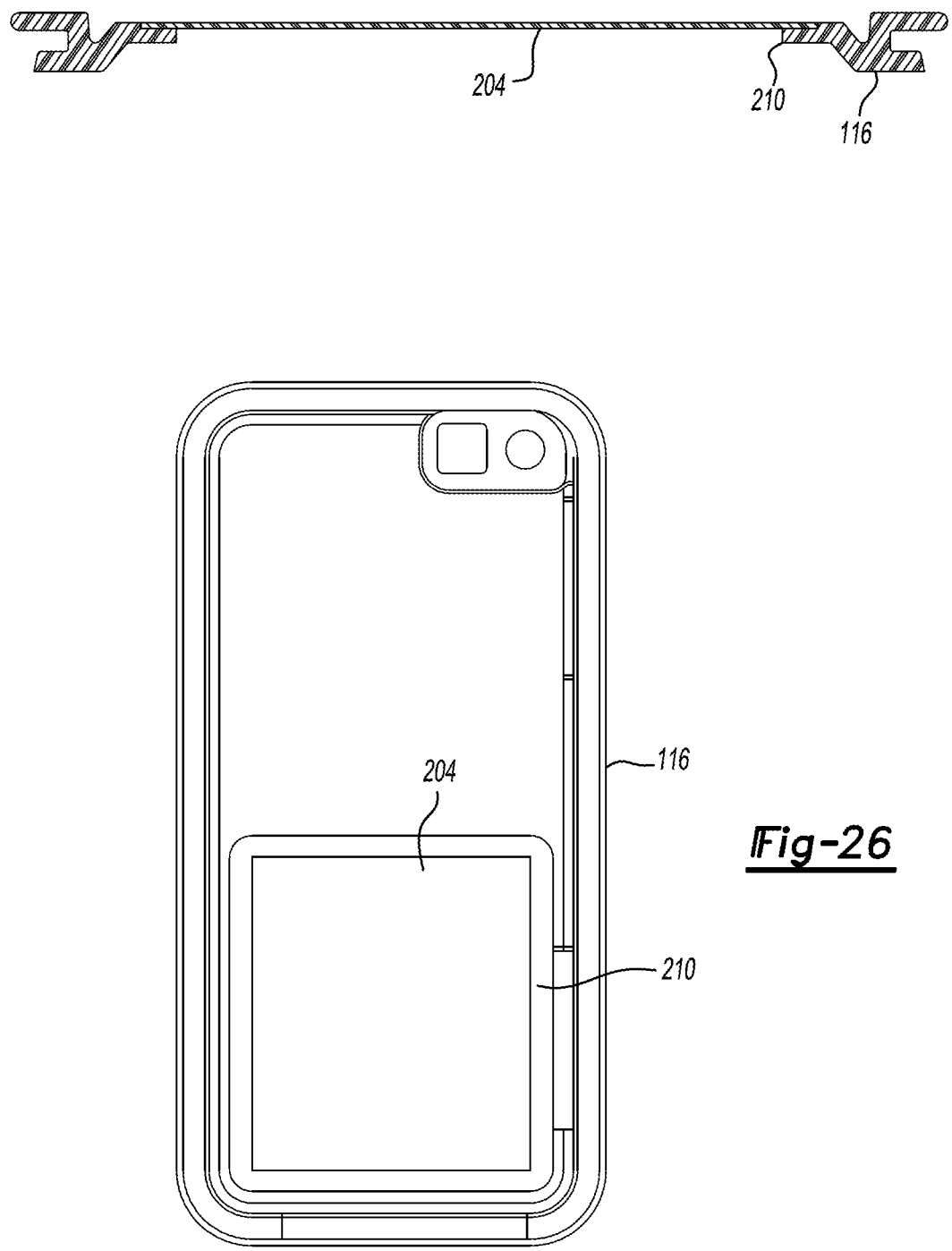

WATERPROOF CASE

CROSS REFERENCE TO RELATED APPLICATIONS

This application is a continuation application of U.S. application Ser. No. 15/692,786 filed on Aug. 31, 2017 which is a continuation application of U.S. application Ser. No. 13/591,944 filed on Aug. 22, 2012 which claims priority to provisional application No. 61/526,093 filed on Aug. 22, 2011 and is herein incorporated by reference in its entirety.

FIELD OF THE INVENTION

The invention relates to water and air sealed cases for electronic devices.

BACKGROUND OF THE INVENTION

Waterproof housings for various devices are known in the art. However such water proof housings are not specifically designed for the actuation of toggles or screens of the enclosed electronic device and to provide a clear transmission of sound from the interior of the case to an exterior of the case and/or from the exterior to the interior of the case. There is therefore a need in the art for an air and water tight case that has an improved sound transmission and allows a user to actuate various portion of the device while positioned within the case.

Various water proof applications use porous membranes that allow air to pass through but not water & while this is waterproof, this has its limitations. Such porous membranes are not reliably waterproof as the pores are easily damaged with abrasion, may leak over time and are not suitable for a dynamic use where they are subject to ongoing movement such as to protect against damage from accidental drops, daily use, or outdoor use. Also many membranes are made with PTFE (Teflon), which has chemical properties of strong resistance to chemical attack as it is relatively inert, but at the same time PTFE is very difficult to adhere due to its low surface energy and low ability to bond to other substances. The low surface energy or the low "wetability" of PTFE means that is difficult to form a strong adhesive bonding, which is the basis of waterproof protection. Both the porosity of the material and its material properties are limitations in utility for waterproof cases. There is therefore a need in the art for an improved water proof housing that utilizes air impermeable acoustic membranes.

SUMMARY OF THE INVENTION

In one aspect, there is disclosed a protective case for an electronic device that includes a main housing and a lid. The main housing and lid are removably joined to define an air and water tight volume receiving an electronic device. The electronic device includes a switch. The main housing includes a slot formed therein proximate the switch of the electronic device. The main housing includes a pair of separated raised walls formed thereon about the slot. A toggle is rotatively positioned within the slot and between the raised walls.

In another aspect, there is disclosed a protective case for an electronic device that includes a main housing and a lid. The main housing and lid are removably joined to define an air and water tight volume receiving an electronic device. The electronic device includes a switch. The main housing includes a slot formed therein proximate the switch of the electronic device. The main housing includes a pair of separated raised walls formed thereon about the slot. A toggle is rotatively positioned within the slot and between the raised walls. The toggle includes a button attached to a shaft on an exterior of the main housing. The button is rotatable to actuate the toggle.

BRIEF DESCRIPTION OF THE DRAWINGS

FIG. 12 is a partial perspective view of the lid and membrane assembly for a second microphone port of the second embodiment;

FIG. 13 is a partial perspective view of the lid and membrane assembly for a second microphone port of the second embodiment;

FIG. 26 is a perspective view and sectional view showing a port and thin walled membrane.

DETAILED DESCRIPTION OF THE PREFERRED EMBODIMENTS

Figure 1:
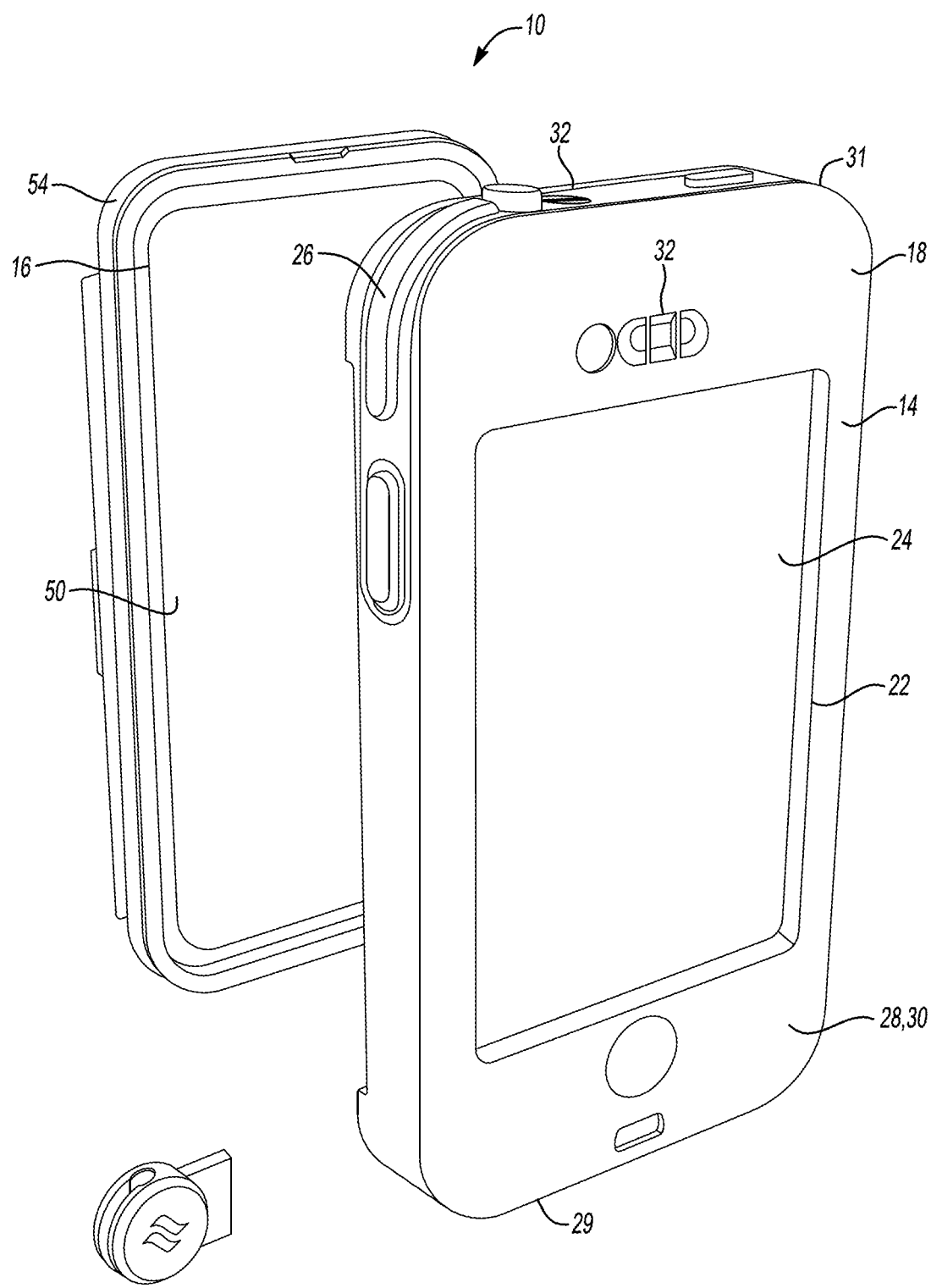
FIG. 1 is an exploded perspective view of one embodiment of a protective case.

Referring to the various figures there are shown various embodiments of a water proof case 10 that includes water and air tight acoustic membranes. For the purposes of creating a waterproof housing to protect the contents of the housing, it is desirable to have a housing made with thick solid walls made of a structurally strong water proof material that can withstand the external environment that it is exposed to and as few openings as possible. However for the functions of some electronic devices, there exists a need to have sections that allow the actuation of the device or to somehow allow input and output to be captured. For example, specific functional features of enclosed devices may require sensory response or input such as to proximal visual, reflective, conductive, magnetic, electromagnetic, vibratory, pressure, or acoustic elements in the external environment in order for features to operate or buttons or switches to actuate functions. The enclosed devices may have other features that capture input or generate output, such as to capture images, acoustic environment, signals, or to generate light, sound, vibrations, signals. In some of the features described, a consistent thick wall for a waterproof housing will not allow the device to serve these functional purpose within the housing. Hence, some sections may require specific elements to allow the enclosed device to function and operate in a waterproof environment. Of all of these functions, one of the more challenging elements is the capture and transmission of acoustics in a waterproof housing as this this is usually achieved through the use of thin walled sections often with porous membranes that allow the transmission of sound through air permeable membranes, however at the cost of allowing sound to be captured or transmitted at the cost of being less waterproof. The use of porous membranes for waterproofness may be unreliable as the size of the pores can be easily expanded or punctured upon touch, which would render them not waterproof. There exists a need to create a solution for capture or acoustic transmission does not compromise waterproofness. In the current state of the art, it is not known which materials are suitable to be used as impermeable membranes with desired acoustic properties and stability for water immersion and for outdoor use. Additionally, acoustic membranes in the present application are water proof which is a function of having a strong adhesive to form a strong bond with the adhesive bond strength and the cohesive strength of the materials indicating the degree of waterproofness. However, one would expect that a strong bond is better and an adhesive that holds the membrane tightly would be better for waterproofness. However, what is not obvious and a part of this invention is that the adhesive in fact must be compliant for dynamic use over a wide range of environmental conditions to allow the membrane to freely move and displace the air volume contained within the housing. In addition, to avoid vibrations from the material of the housing to affect sound transmission into and out of the housing, an air and water tight compressible seal made of an acoustic dampening material such as foam or an elastomer material may be used to surround microphones and seal it from the housing to prevent feedback from other sound sources within the housing, such as speakers and vibrations of the housing itself. The compressible elastomer or foam further enhances the compliance of the way in which a membrane is mounted so that it is not compressed between two stiff materials that inhibit its ability to vibrate or displace the air volume and react to the sound pressure differential created when a sound source passes through the air and watertight membrane assembly.

In one aspect, the ability to transmit sound in and out of an air and water tight housing through the design of the membranes and housing differs from that of those known in the art. In order to have an increase in overall volume and lower frequency sound allowing the acoustic membrane to function properly with less distortion and a more full bass range for a microphone, it is desirable to create an air tight seal between the microphone port of the electronic device and the acoustic membrane to avoid a reduction of the dB of lower frequency sound that passes through the membrane and increase overall loudness. Furthermore, feedback from other internal sources of sound, including speakers and the housing itself, may be isolated such that sound received is from an external source only.

In one aspect, a thin waterproof acoustic membrane functions best when it is mounted closer to the microphone and closer to the internal portion of the housing as its vibration becomes the sound source for the microphone. A spaced membrane located further from the microphone may lower the volume of sound detected by the microphone and the membrane may need to have a larger dimension or be of a thinner material to achieve the same effect, which is a constraint in developing a functional waterproof housing to transmit sound for some devices.

Figure 23:
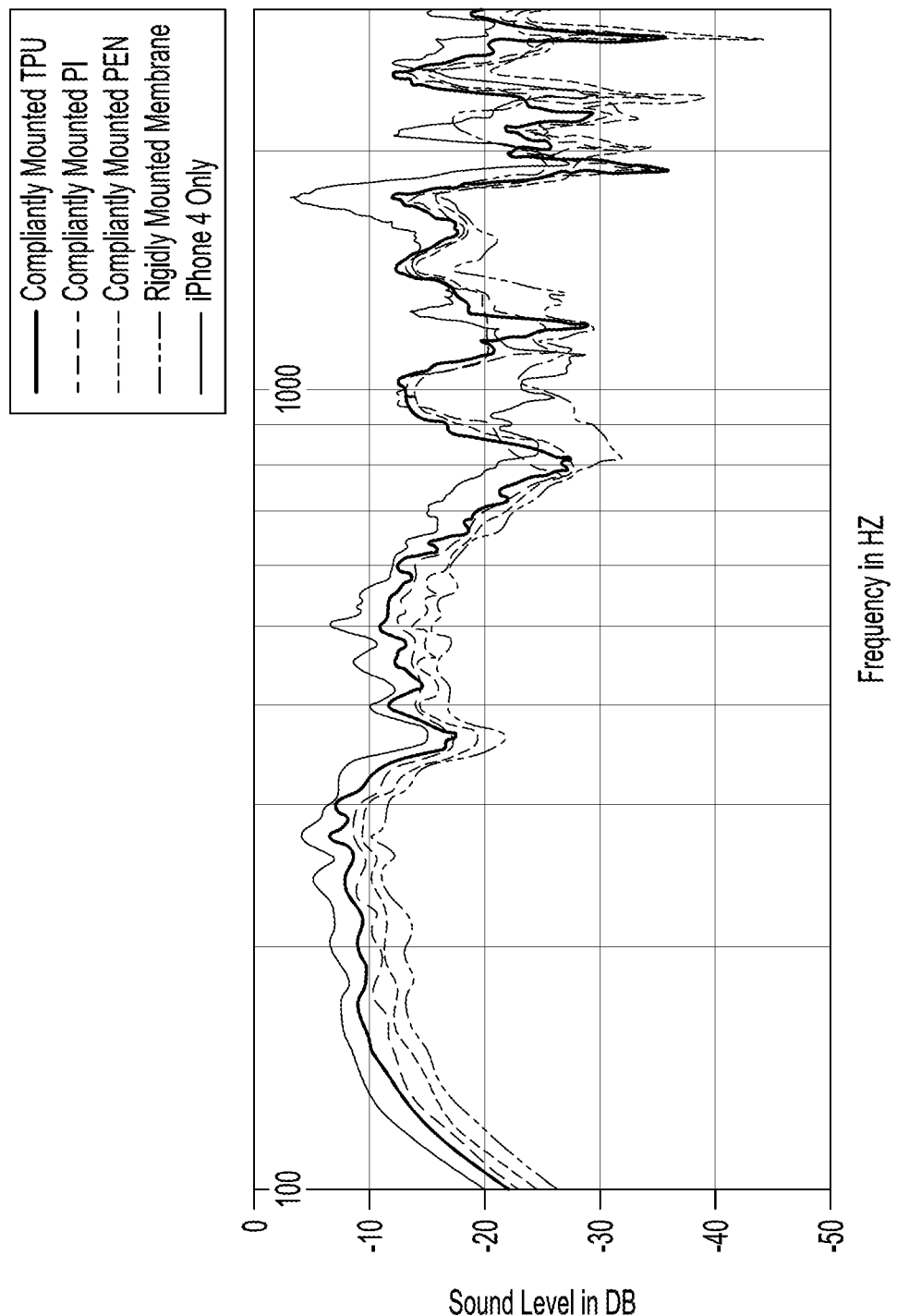
FIG. 23 is graph of acoustic responses for membranes.

In one aspect, where the enclosed electronic device functions serves a functional purpose of voice communication, there are disclosed materials that are suitable to form acoustic membranes that produce a suitable frequency range for the human voice, primarily from 100 Hz to 3000 Hz. By selecting materials with a suitable Young's modulus and density, the membrane frequency response can be adjusted to a target frequency. As shown in FIG. 23 the compliantly mounted membranes have a higher output in decibels than the rigidly mounted membrane.

For a speaker, a large dimension membrane is desirable to vibrate and transmit sound outward. Such a membrane may be mounted to allow it to flex or vibrate using a compliant mounting or the membrane may have a sufficiently large dimension or a sufficiently thin dimension to vibrate and transmit sound outward.

In order to create a waterproof seal, an appropriate adhesive must be selected to create a strong bond taking into account the surface energy of the materials, the surface area for bonding and the compliance of the bond allowing the membrane to vibrate and transmit sound.

Equally important to the selection of the acoustic and waterproof membrane materials are the boundary conditions selected of how the membrane is mounted as this will also affect the frequency range of the membrane. More compliant, less rigid mounting conditions will result in a lower frequency range. The lowest frequency of resonance of the membrane is limited by key mechanical and material parameters. In a compliantly mounted membrane, the low frequency mode of a membrane rigidly bonded to the surrounding housing can be determined to approximate the frequency response of a diaphragm defined as a free vibrating edge-clamped circular disc. The natural frequency of such a disc is determined by the equation. $f_{mn} = \alpha_{mn}/4\pi \times \sqrt{(E/3\rho(1-v^2))} \times (h/a^2)$: where $\alpha_{mn}$ is a vibrating modes constant of the diaphragm, h is the thickness of the diaphragm, a is the effective radius of the diaphragm, $\rho$ is the mass density of the diaphragm material, $v$ is the Poisson's Ratio of the diaphragm material, and E is the Young's Modulus of the diaphragm material. The resonant frequency of the membrane may be governed by this equation. It will show up in the frequency response as a resonance and there may be other vibration modes at higher frequencies compared to the lowest mode given by this equation. Thus, in order to transfer energy from the acoustic membrane to the speaker, a low modulus is desirable. Specifically, a flexible membrane with low density is desirable so that the movement of the membrane is maximized when impacted by a sound wave such that the sound wave is then re-produced on the other side of the membrane. This resonance shows up as a peak in the frequency response of the speaker with membrane. It is further possible to tune the membrane frequency to provide additional output from the speaker-membrane unit. This can be achieved by using soft or compliant foam to mount the membrane to the housing. In a preferred embodiment, soft foam with a viscoelastic adhesive tape on both sides can be used to mount the membrane to a housing as it creates a strong waterproof bond suitable for dynamic use. More rigid edge conditions for the membrane will result in a higher frequency response for the membrane. Hence, the mode frequency of the membrane is dependent upon the Young's Modulus, density and diameter and thickness of the material.

In one aspect, the membrane material may be selected with Young's Modulus from 300 MPa up to 20 GPa and a density from 500 kg/m3 up to 2500 kg/m3. Some examples of such materials include thermoplastic films PEN, PI, PET, PBT, PE, PC, PVC, PP, EVA; thermoplastic alloys, themosets, thermoplastic elastomers such as TPE/TPU), rubbers such as butyl, ethylene propylene, silicone, fluorosilicone, epichlorohydrin, chlorosufonated polyethylene, fluoroelastoemers, perfluoroelastomer, tetrafluoroethylene, tetrafluoropropylene, polychloroprene, organic films such as, collagen films or films made of natural products like starch, proteins or synthetic polymers, metallic foils or metallized films including. Aluminum foil and plastic films with metal deposits, and multilayer systems composed of laminates of different combinations of materials such as PET with foil laminated together. The size of the membrane and the thickness of the material may also be chosen to achieve a specific frequency range. In one aspect, a thinner membrane will lower the membrane frequency response and conversely, a thicker membrane will result in a higher frequency response. A larger membrane will give a lower frequency response than a smaller membrane using the same material. For the purpose of a small device with small acoustic features such as a telephone, mp3 player, video recorder, camera, headphones, and hearing aid, the thickness of the membrane may ideally vary from 5 microns up to 1000 microns depending upon the material. The damping or energy absorption characteristics of the membrane also need to be considered. Higher damping (absorb more energy) materials will have a smoother frequency response and show less sharp peaks or resonances in their frequency response. This will result in a more natural sound transmission externally from a speaker.

A microphone usually may include an airtight seal around the microphone in order for the membrane to function optimally, allowing a lower frequency response, louder overall volume and greater clarity with background noise reduction; however the opposite may be required for a speaker membrane. If the volume of the air between the device and the membrane is reduced, possibly by sealing the speaker membrane, or reducing the volume of air between the device and the membrane, the ability of the membrane to vibrate is impeded so that overall sound transmission is reduced. A speaker membrane may include a sufficient air gap or air cavity to allow the membrane to vibrate. The transmission of sound in a speaker is a function of the material properties of the membrane, thinness of the membrane, size of the membrane, compliant mounting of the membrane, and the size of the air cavity as all of these create the effect of allowing a flexible membrane compliantly-mounted to create low resistance to respond to air pressure. In particular, for membranes that are not permeable to air or water, it is desirable to utilize the pent up air pressure in the air chamber or case to force the membrane to vibrate so that it acts as an air piston. A compliantly mounted membrane allows it to vibrate, instead of clamping it tight which inhibits movement. A compliantly mounted membrane includes a spring-like effect that allows the membrane to vibrate and act as an air piston responding to changes in air pressure to move the membrane allowing sound to transfer and increases an overall sound level. If some instances, sound from a sound source such may be redirected within an air and watertight housing so that a sufficiently large sized membrane and sufficiently large sized air cavity is available to vibrate to act as an air piston. In an air and water tight housing, the sound may be redirected through the use of strategic air cavities and air gaps to allow the air pressure to move to another larger area of the housing that can vibrate and act as the speaker membrane to allow sound waves to propagate to the outside of the housing. The sound can be redirected in such a way because the housing includes non-permeable air tight membranes so that there is minimal loss in acoustic energy as there is little transmission loss of the sound since there are no air vents that would reduce the air pressure and reduce the potential vibrational energy of the membrane. Sound waves are thus generated on the other side of the air and water tight membrane to the external environment which can then propagate through the external medium, whether air or water. It is known in the art that the sound impedance of air and water are different which limits the ability for sound to travel from a sound source in air and to be propagated through water without significant transmission loss. Hence, there is a need in the art to be able to propagate sound underwater without significant signal attenuation. An air and water tight housing that employs air chambers and a non-permeable membrane to create an air piston permits sound from a source inside the housing to propagate through an external aqueous environment without significant attenuation because the acoustic energy within the housing is converted to vibrational energy of the membrane so that sound waves may be generated on the external side of the air and water tight acoustic membrane in water. These sound waves generated within water experience less acoustic impedance underwater so that sound may be propagated much further, possibly throughout the entire body of a contained water mass, such as a swimming pool. Hence, an operator of a device contained within such an air and water tight housing may listen to music underwater even if they relatively further away from the housing.

In addition, in some instances, the membrane may need to be isolated from adjacent structures through the use of dampening materials such as foam or rubber. This may be required if there is vibrations/feedback that bounce off the housing that create interference with the speaker and depends upon the spatial orientation of the features within the housing, although in general, the larger the volume of air, the less interference is created.

Referring to FIGS. 1-8 there is shown a first embodiment of a protective case 10 for an electronic device 12. In one aspect the protective case 10 includes a main housing 14 and a lid 16. The main housing 14 may include a case member 18. The case member 18 may be formed of various materials to provide a rigid structure for the protective case 10. In one aspect, the case member 18 may be formed of a clear material such as a clear plastic resin. Various plastic resins including polycarbonate may be utilized.

The case member 18 may include various slots and access ports 20 formed therein. The slots and access ports 20 may be used to actuate various functions using buttons or switches and allow sound transmission, as will be described in more detail below. Additionally, the case member 18 may include a window portion 22 formed therein that receives a screen member 24. The case member 18 may include sealing and locating material 26 applied thereon on defined portions of the case member 18, such as about the slots and access ports 20 to provide location and a sealing for the electronic device 12 as well as allow access to various toggles of the electronic device as will be described in more detail below. In one aspect, the sealing and location material 26 may include various plastic elastomers such as a TPE-TPU material or may be formed of other materials.

As referenced above, the case member 18 includes a screen member 24 attached thereon about the window portion 22 of the case member 18. The screen member 24 may be a separate piece attached using various methods including using an adhesive, welding, molding or otherwise attaching the screen member 24. Alternatively, the screen member 24 may be formed with the case member 18 and may have a thickness that is different from other portions of the case member 18. In one aspect, the screen member 24 may be formed of a clear material allowing viewing of a display of the electronic device 12. The screen member 24 may have a thickness that allows a user to manipulate a touch screen of the electronic device 12 through the screen member 24. In one aspect, the screen member 24 may be formed of a polycarbonate material and have a thickness of about 0.1 to 0.5 millimeters which will allow a user to manipulate a touch screen with or without another screen protector applied to the electronic device 12.

The case member 18 includes at least one sound chamber 28 formed thereon. The at least one sound chamber 28 may be defined by an area of the case member 18 that includes a thinned wall section 30 or wall section that has a smaller thickness than an adjacent portion of the case member 18. The thinned wall section 30 defines an air space 32 allowing for sound to be transmitted to and from speakers and/or microphones of the electronic device 12. In the depicted embodiments of the figures, two sound chambers 28 are defined in a lower portion 29 of the case member 18 and another sound chamber 28 is defined in an upper portion 31 of the case member 18. It should be realized that various numbers of sound chambers may be present.

In one aspect, the case member 18 also includes at least one secondary sound port 32. In the depicted embodiments two secondary sound ports 32 are formed in the lower portion 29 of the case member 18. The two secondary sound ports 32 include a speaker port 33 and a microphone port 35. Another two secondary sound ports 32 are formed in the upper portion 31 of the case member 18 and include a second speaker port 37 and a second microphone port 39. The secondary sound ports 32 may be defined by slots 34 formed in the case member 18. The slots 34 may be covered with the sealing and location material 26 that was discussed above or have different structures as will be discussed in more detail below.

In one aspect, the sealing and shock mitigation materials 26 may be applied as a membrane 27 in the region of the secondary sound ports 32. The structures of the membranes 27 may vary based upon the type of secondary sound port 32.

As stated above, the protective case 10 includes a lid 16. The lid 16 may be formed of a clear material as specified above with respect to the case member 18. The clear lid allows for a visual inspection of an O-ring as described in more detail below. The lid 16 includes a planar surface 50 that terminates at an edge 42. The edge 42 includes the attachment structures 38 that mate with the main housing 14. The lid 16 also includes a groove 52 that receives a gasket 54. The gasket 54 may be an appropriately sized O-ring having a desired shore durometer that seats with the main housing and lid 16 to provide a water tight seal. The lid 16 may also include a camera transmission portion 36 formed thereon, as described above.

Figure 2A:
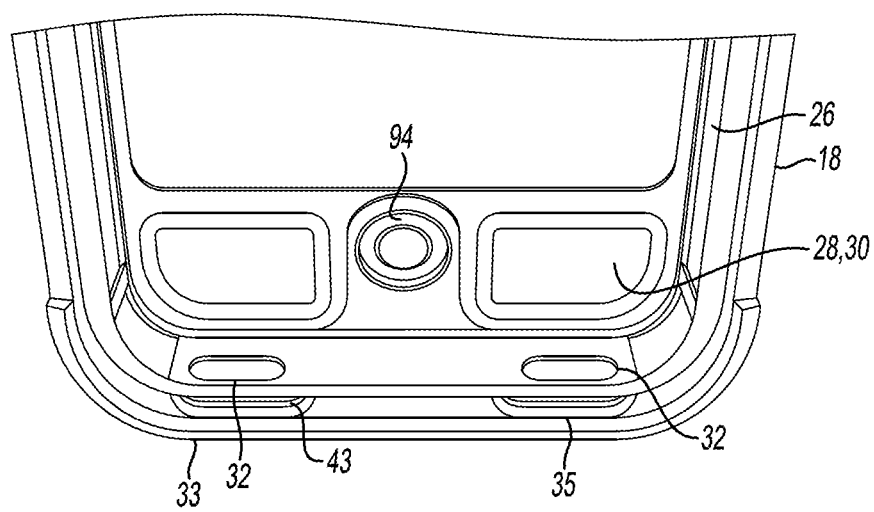
FIG. 2A is a partial perspective view of the lower portion of the case member.
Figure 2B:
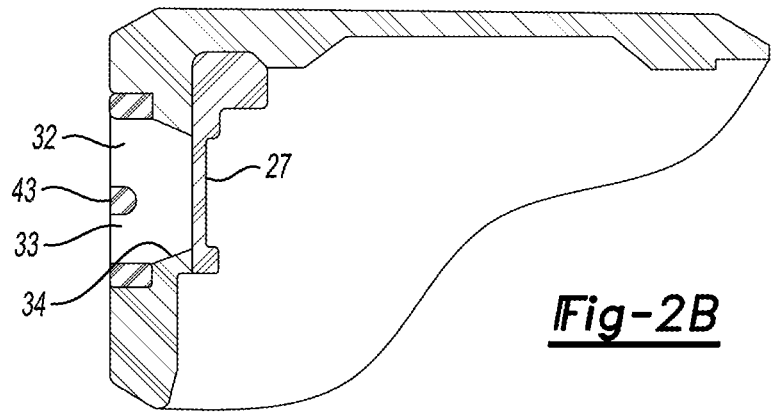
FIG. 2B is a partial sectional view of the speaker port and TPU.
Figure 2C:
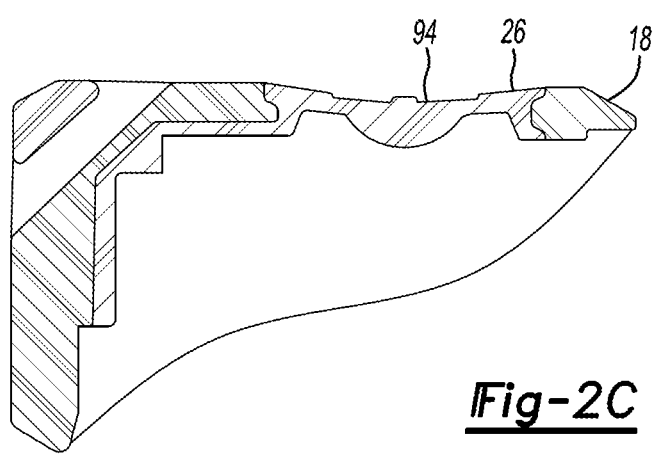
FIG. 2C is a partial sectional view of the home button port and membrane.

Referring to FIG. 2A-B, the membrane 27 positioned about the speaker port 33 may have a unitary structure positioned over the port 33. The unitary structure may be in the form of a thin film or sheet of material that covers the opening and is attached to the case member 18 internally preventing the entry of water and air allowing for a clear transmission of sound. In one aspect, the membrane material may be that as described above. It has been found that membrane materials having these properties allow for the transmission of sound clearly without degradation of the bass frequencies and prevents feedback and echoes within the case. The membrane 27 about the speaker port 33 provides an acoustic seal of the speaker of the device 12 to prevent reverberation and feedback. The case member 18 may include a grill structure 43 formed therein over the opening to the speaker port 33. The grill structure 43 protects the membrane 27 during assembly and use.

Figure 3A:
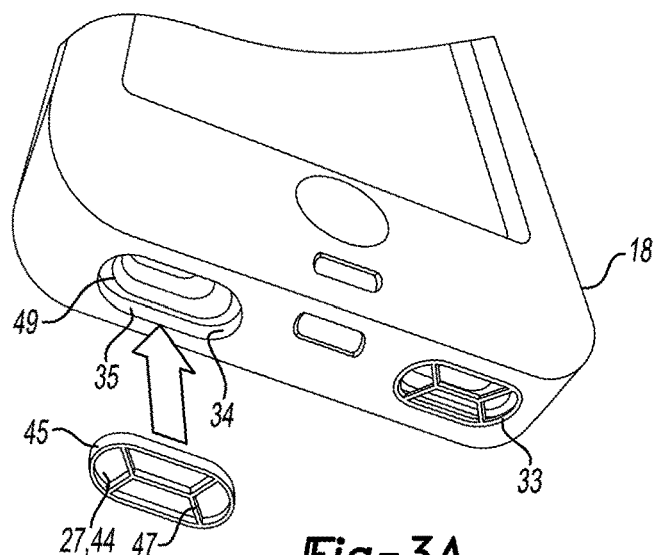
FIG. 3A is a partial perspective view of the lower portion of the case member.
Figure 3B:
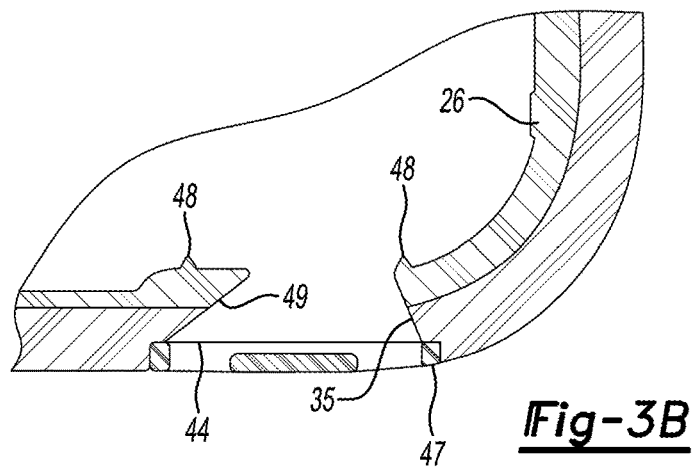
FIG. 3B is a partial sectional view of the microphone port and membrane.
Figure 3C:
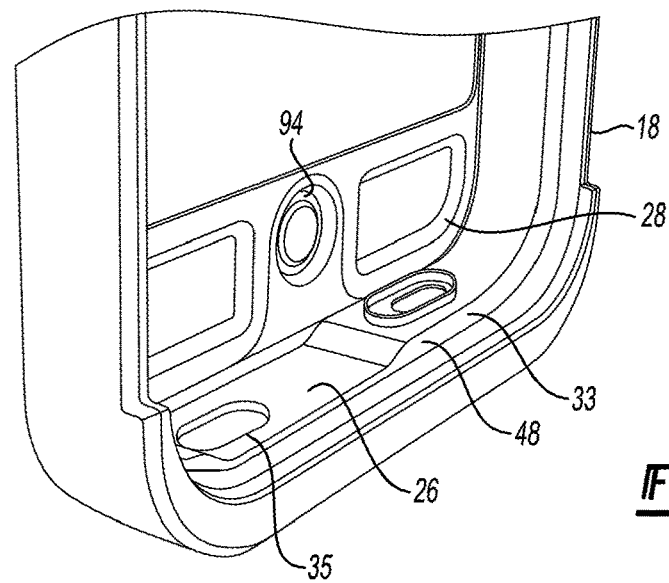
FIG. 3C is a partial perspective view of the lower portion of the case member dealing with the sealing rib of the microphone port in one embodiment of a protective case.

Referring to FIGS. 3A-C, the membrane 27 positioned about the microphone port 35 of the device may have a first membrane assembly 43 positioned within the microphone port 35. The membrane assembly 45 may include a membrane 44 attached to a grill structure 47. The membrane 44 may be formed of the materials described above. In one aspect the grill structure 47 may be formed of a clear material allowing for use a UV curable adhesive to attach the membrane assembly 43 to the case member 18. The membrane assembly 45 provides a water and air tight seal of the microphone port 35. The microphone port 35 includes a cone shaped channel 49 to direct and amplify sound as it travels to a microphone of the device 12 within the case 10. The sealing and location material 26 positioned within the case member 18 and positioned about the microphone port 35 continues the cone shaped profile and includes a rib or raised ridge structure 48 that mates with the device isolating the speaker preventing degradation of the sound transmission. In one aspect a separate structure may be attached about the speaker port to define to rib 48.

Figure 4A:
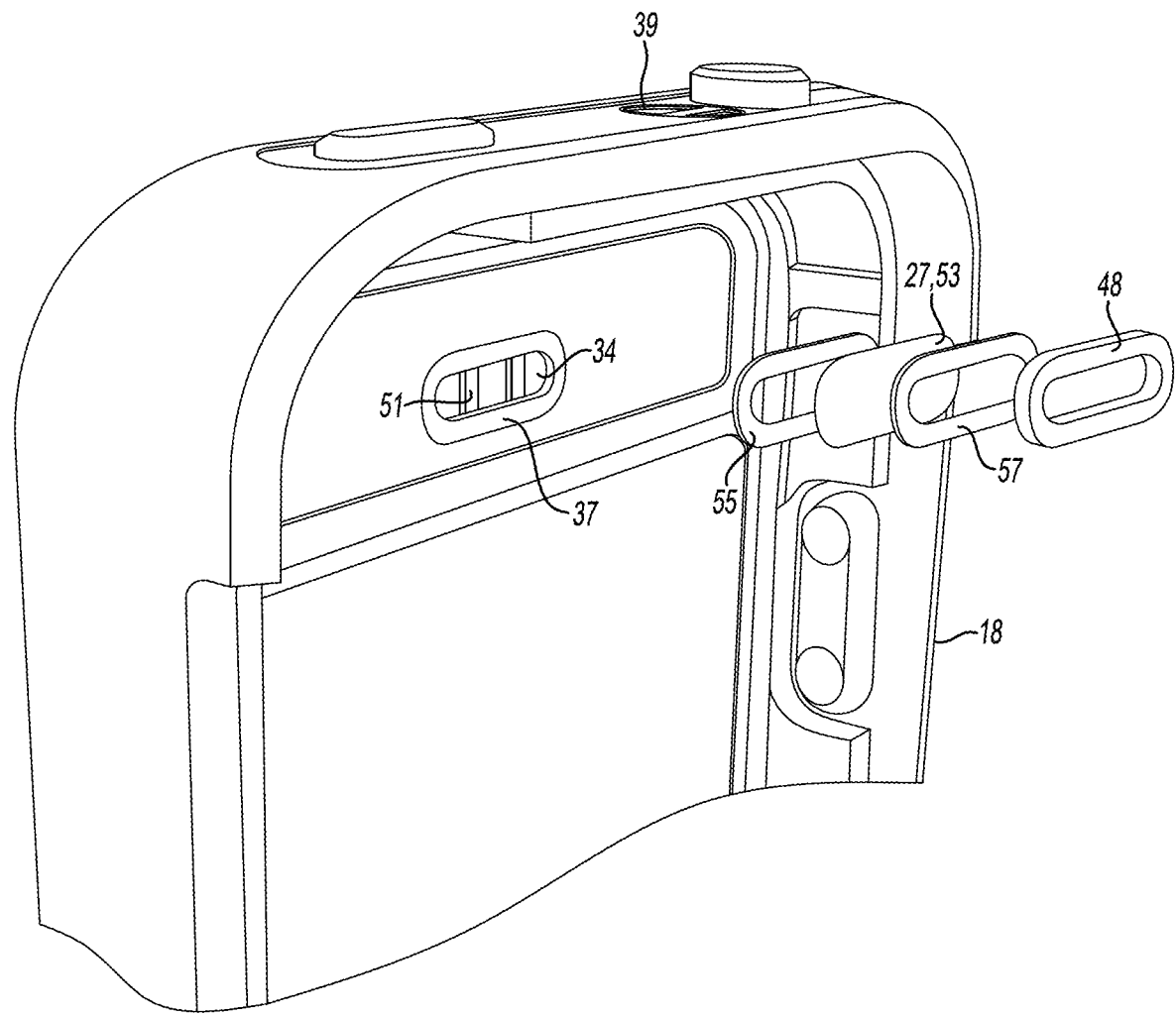
FIG. 4A is an exploded partial perspective view of the upper portion of the case member.
Figure 4B:
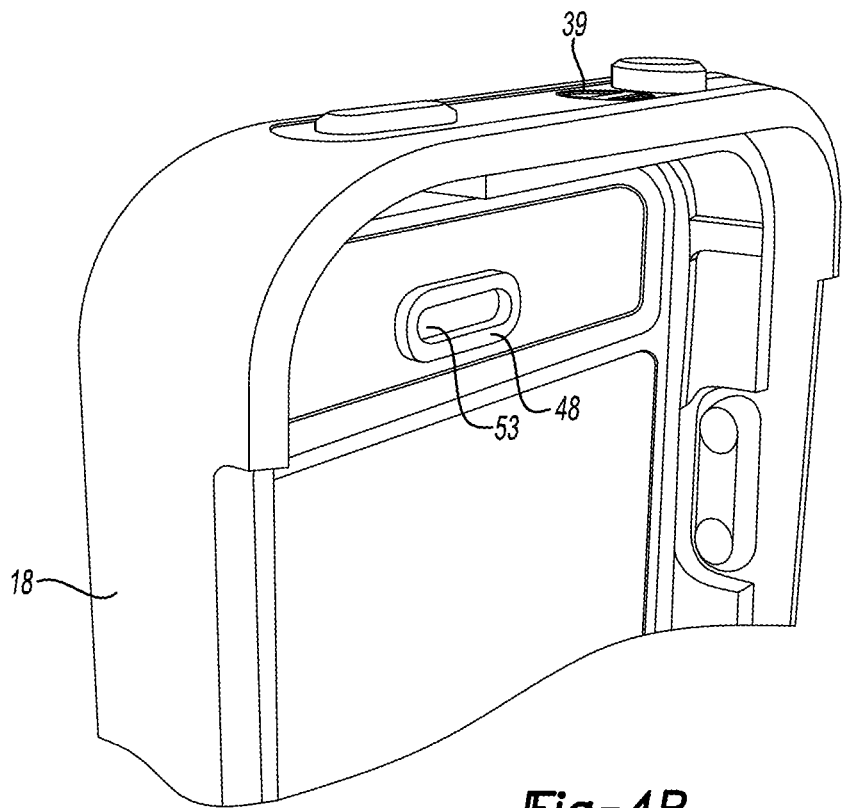
FIG. 4B is an assembled partial perspective view of the upper portion of the case member and second speaker port.
Figure 4C:
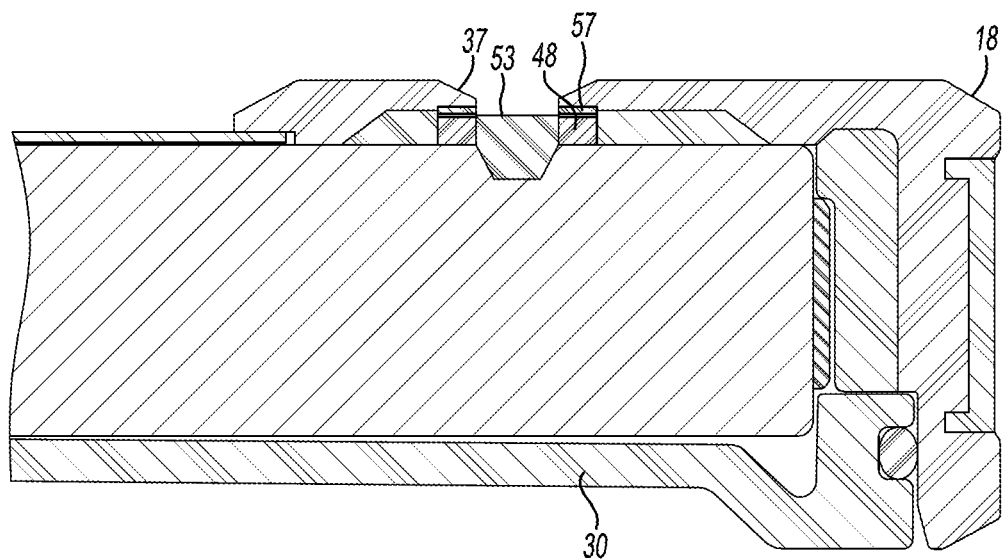
FIG. 4C is a partial sectional view of the second speaker port and membrane.
Figure 5:
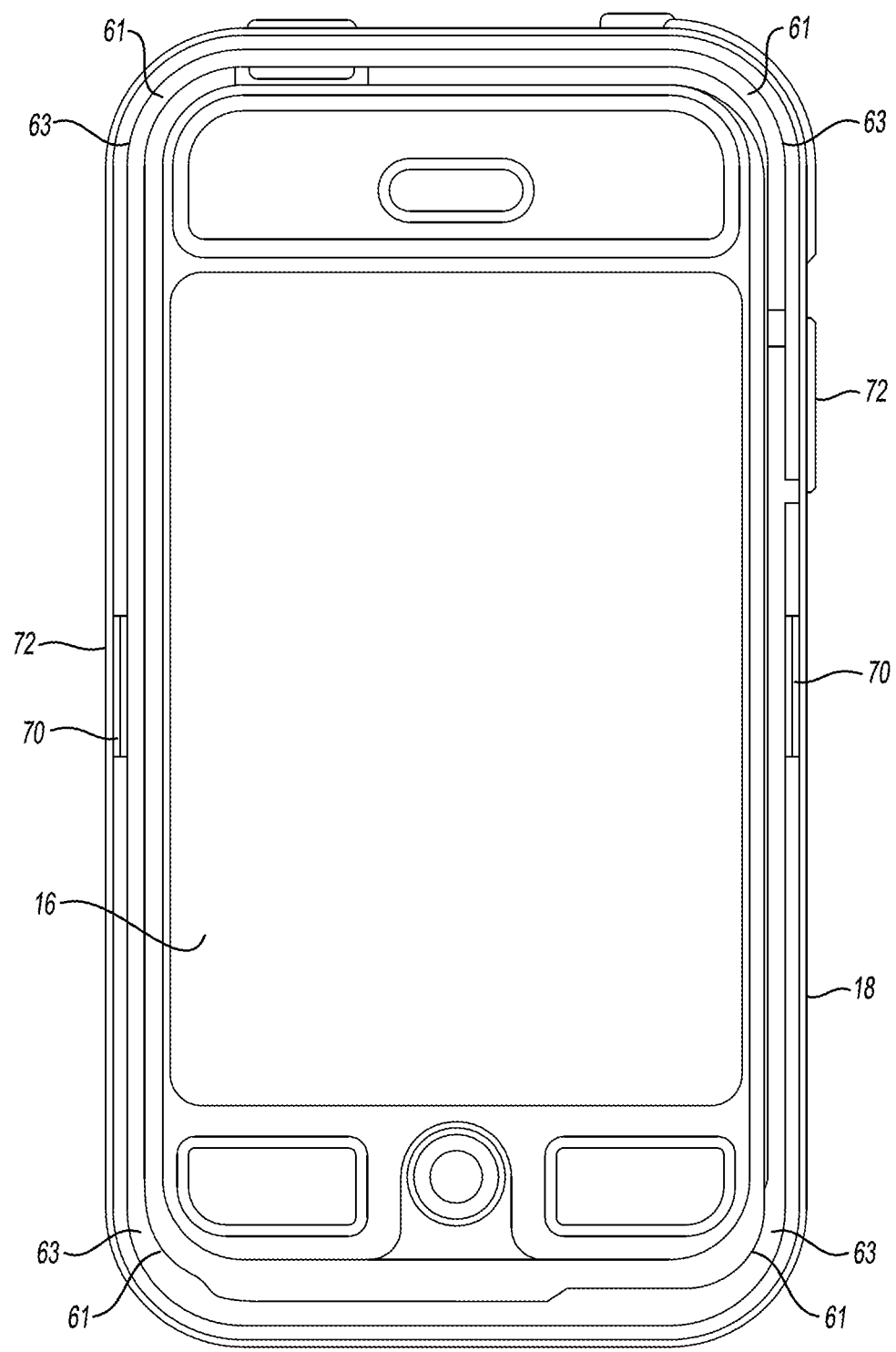
FIG. 5 is a front view of the case.

Referring to FIGS. 4A-C, the second speaker port 37 may include a grill structure 51 formed in the case member about the speaker port 37. The grill structure 51 protects the membrane 53 from damage during assembly and use. A foam based adhesive 55 such a double sided tape may be applied about the second speaker port 35 internally to the case member 18. In one aspect the foam adhesive 55 may have a thickness in the range of 0.4 millimeters. A membrane 53 is attached to the foam adhesive 55 bonding the membrane 53 to the case member 18 providing a water and air tight seal. In one aspect the membrane 53 may have materials properties as described above. Another adhesive 57 may be positioned about the membrane 53 such that a raised rib 48 may be attached about the membrane 53. The raised rib 48 seals a microphone as described above. The thickness of the foam adhesive 55 provides a separation of the membrane 53 from the case member 18 which in combination with the thickness and material properties of the membrane 53 allow the membrane 53 to freely vibrate and allow for a clear transmission of sound including in a bass frequency range. The rib structure 48 directs the sound from the second speaker of the device to the membrane 53 and isolates the sound from other portions of the case member 18 preventing sound transmission to the microphones of the device positioned within the case 10.

Referring to FIG. 4A-B, the second microphone port 39 may include a similar membrane assembly as described above with reference to the microphone port 33. A grill assembly 47 and membrane 57 may be attached within the second speaker port 39. Additionally, the sealing and location material 26 positioned within the case member 18 and positioned about the second microphone port 39 includes a rib or raised ridge structure 48 that mates with the device isolating the microphone preventing degradation of the sound transmission.

It should be realized that various numbers of secondary sound ports 32 may be present. In one aspect, at least one of a sound chamber 28 or a secondary sound port 32 is present in the case member 18.

The case member 18 may include a camera transmission portion 36 formed thereon. The camera transmission portion 36 may be defined by a thin walled section. The thinned walled section 30 may provide less distortion and alleviate focus issues with the electronic device 12 positioned within the volume of the protective case 10. In one aspect the camera transmission portion may include an additional lens such as a wide angle or fish eye lens formed or attached to the camera transmission portion 36.

Figure 6A:
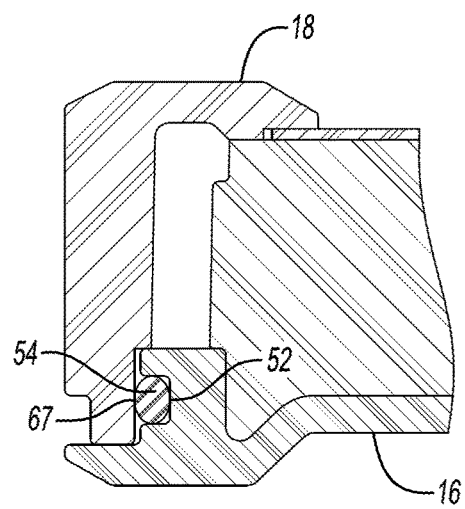
FIG. 6A is a partial sectional view of the case member, lid and O-ring joined where there is no attachment structure.
Figure 6B:
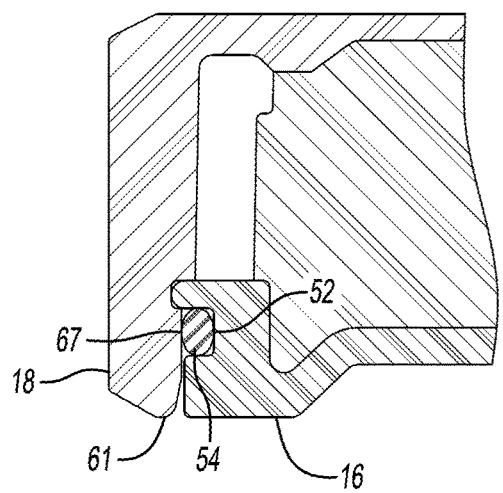
FIG. 6B is a partial sectional view of the case member, lid and O-ring joined in a region of the first attachment structure.

Referring to FIGS. 6A-D, the case member 18 and lid 16 may include attachment structures 38 for joining the main housing 14 with the lid 16. In the depicted embodiments the attachment structures 38 may be formed at various positions on the case member 18. Various types of attachment structures may be utilized. In one aspect, as shown in FIG. 6B a first attachment structure 61 may be present in the corners 63 and adjoining sides of the case member 18 and lid 16. The first attachment structure 61 includes a rounded edge 59 so that the main housing 14 and lid 16 may be joined and separated repeatedly. As can be seen in the figure, the O-ring 54 is compressed between the wall 67 of the case member 18 and the groove 52 formed in the lid 16 which receives the O-ring 54. In one aspect, the O-ring 54 receives a radial compression between the main housing 14 and the lid 16 to provide a water and air tight seal. The radial compression is defined by the load applied to the O-ring 54 from the wall 67 of the main housing 14 and the position of the O-ring 54 in the groove of the lid 16.

Figure 6C:
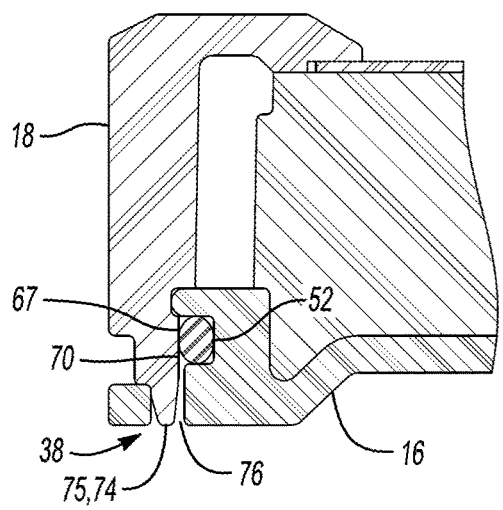
FIG. 6C is a partial sectional view of the case member, lid and O-ring joined in a region of the second attachment structure.
Figure 6D:
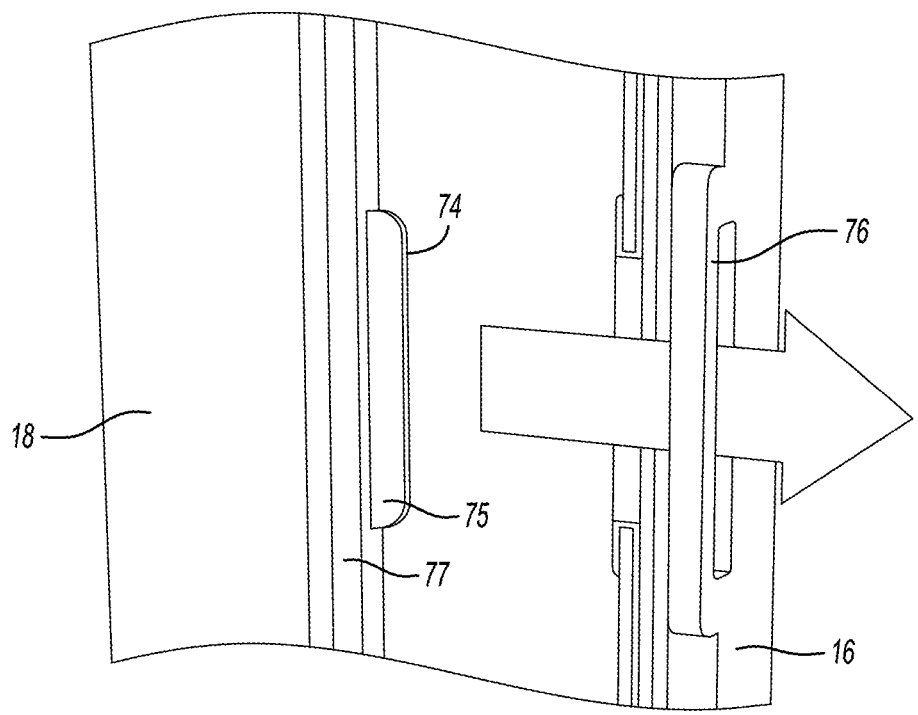
FIG. 6D is a partial perspective view of the second attachment structure.
Figure 7:
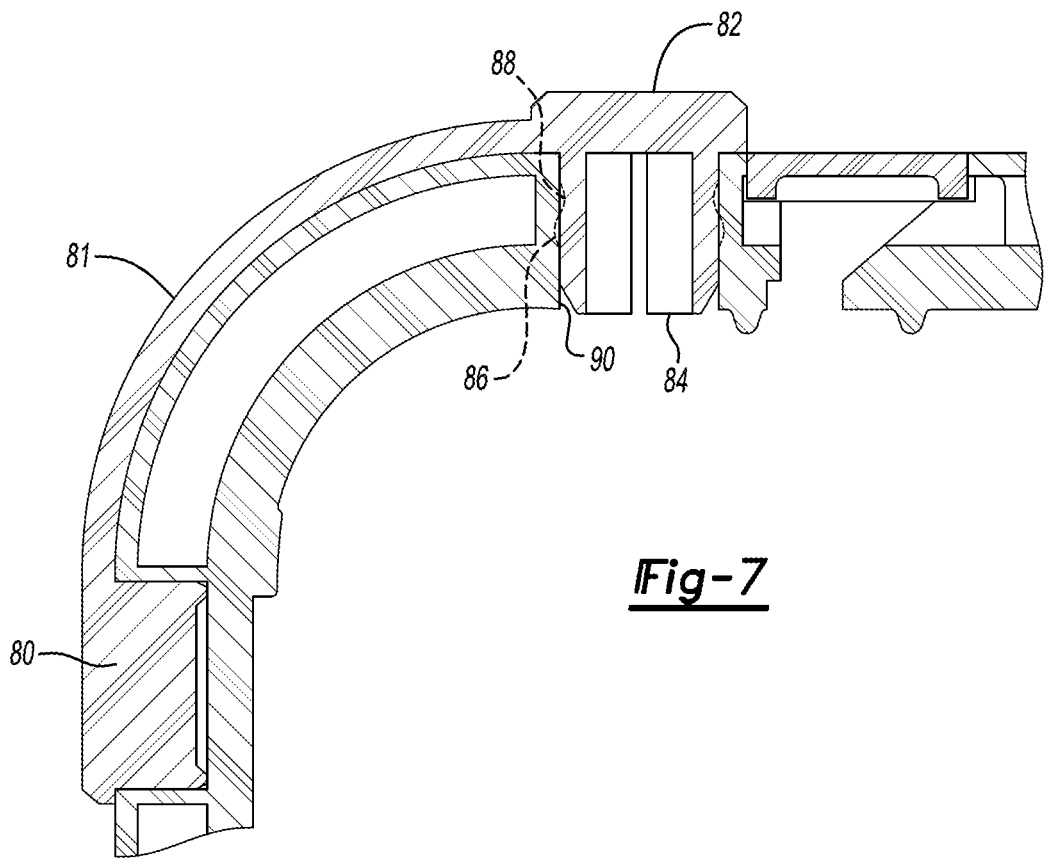
FIG. 7 is a partial sectional view of the case member and a plug.

Referring to FIG. 6C-D, the case 18 and lid may include a second attachment feature 70 present on the lateral or longer sides 72 of the case member 18 and lid 16. The second attachment feature 70 includes a secondary structure 74 on the main housing 14 to stabilize the wall 67 of the case member 18 so that compression of the O-ring 54 does not apply an outward force on the wall 67 away from the O-ring. The second attachment feature 70 includes a tab 75 on the main housing 14 that is trapped within a groove 76 on the lid 16 such that the lid 16 and case member 18 are interlocked. Additionally a bump or protrusion 77 on the lid 16 directs the tab 75 over the O-ring 54 and into the groove 76. As can be seen in the figure, the O-ring 54 is compressed between the wall 67 of the case member 18 and the groove 52 formed in the lid 16 which receives the O-ring 54. In one aspect, the O-ring 54 receives a radial compression between the main housing 14 and the lid to provide a water and air tight seal. The radial compression is defined by the load applied to the O-ring 54 from the wall 67 of the main housing 14 and the position of the O-ring 54 in the groove of the lid 16.

The case member 18 may also include a detent 40 formed thereon that allows a user to separate the main housing and lid 14, 16 after they have been joined. In one aspect the detent 40 is sized and positioned to allow a user to access an edge 42 of the lid 16.

The case member 18 may include additional structures that allow a user to operate the electronic device 12 with a water and air tight seal. The case member 18 may include a plug 44, best shown in FIG. 7 that is attached to the case member 18. The plug 44 includes an attachment structure 80 for mating with the case member 18 and a plug portion 82. The plug portion 82 may include a core 84 that is over-molded to define sealing ribs 86 and a sealing cavity 88 on the exterior surface of the plug 44. The plug core 84 stabilizes the plug 44 so that it consistently seals into the headphone jack portion 90 of the case member 18.

Figure 8A:
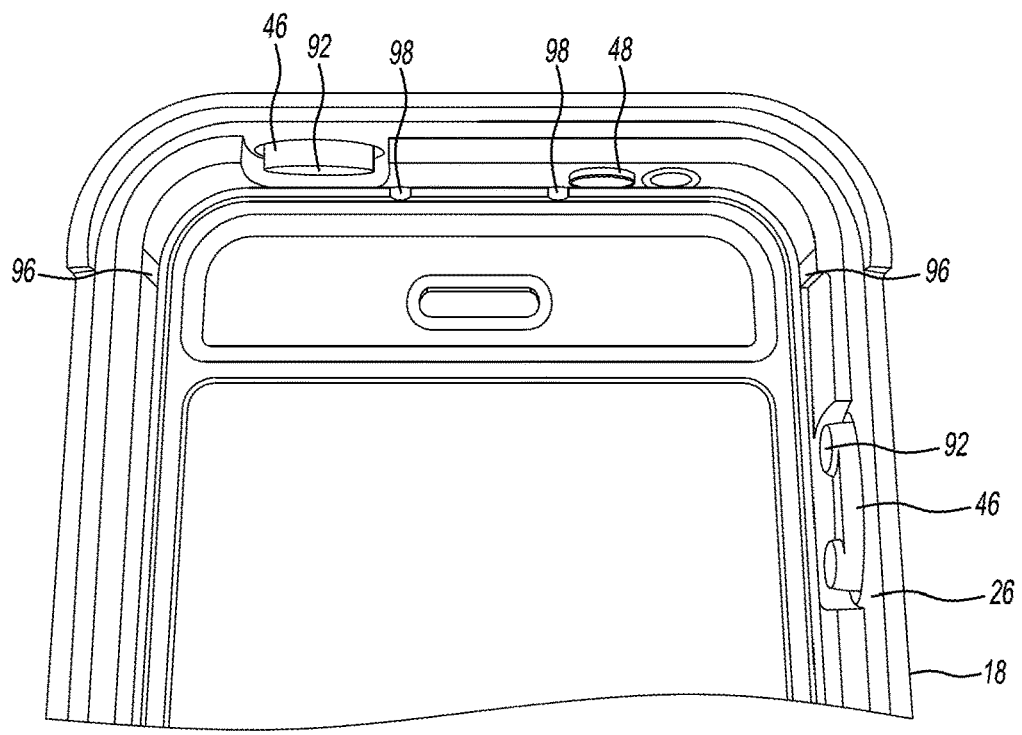
FIG. 8A is a partial perspective view of the upper portion of the case member.
Figure 8B:
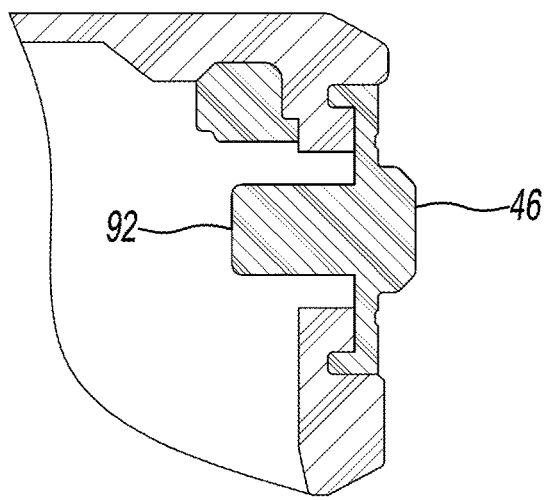
FIG. 8B is a partial sectional view of a toggle membrane.
Figure 8C:
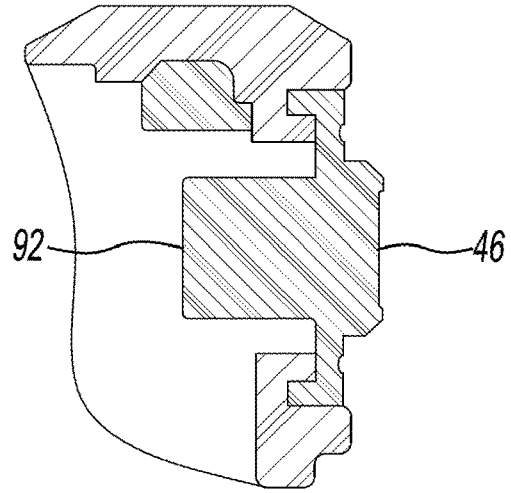
FIG. 8C is a partial sectional view of a toggle membrane.

Additionally, the case member 18 may include various flexible membrane structures 46 to operate buttons or switches associated with the electronic device. Additional flexible membranes 46 not shown may be positioned to operate any number of buttons such as a mute button, volume adjustment button, on/off button or any other type of button. The flexible membrane structures 46 may have various forms and shapes to actuate the desired toggles of the device. As shown in FIGS. 8A-C a flexible membrane structure 46 may include a mechanical feature 92 to actuate the desired toggle. The flexible membrane structures 46 may be formed of the sealing and location material 26 described above or may another material attached to the main housing 14. In one aspect, the flexible membrane structure 46 may be over-molded with the main housing 14 to define a home button actuation point 94. The case member 18 as stated above includes a sealing and location material 26 attached to the interior and exterior walls of the case member 18. Portions of the material 26 on the interior of the case member 18 may include raised structures or bumps 96 to locate and position the device within the case member 18, as best seen in FIG. 8A. Additional stabilization structures 98 may be formed to stabilize the main housing 14 in an over-mold tool.

The case member 18 may also include an attachment structure 48 for attaching to a lanyard allowing a user to carry the protective case 10. The lanyard attachment structure may be positioned at various positions on the case member 18.

In use, a user may position an electronic device 12, such as a phone and in particular a phone having a touch screen within the case member 18. The lid 16 may then be joined with the main housing 14 using the attachment structures 38 such that the O-ring or gasket 54 is seated in the groove 52 of the lid 16 and a radial compression is applied to the O-ring 54 sealing the lid 16 and main housing 14 and provides a water and air tight seal. The user may visually verify that the O-ring 54 is properly seated as the main housing and lid 14, 16 may be formed of a clear material in an area about the O-ring 54. The user may operate the various functions of the electronic device 12 through the use of the various flexible membranes 46. Sound may be transmitted through the protective case 10 using the various sound chambers 28, secondary sound ports 32, membranes 27 and thin walled portions 30 described above. The water and air tight space within the joined case 10 allows for the clear transmission of sound. Additionally, cameras associated with the electronic device are operable and have a clear path for transmission. A touch screen of the electronic device 12 may be operated through the screen member 24 of the case member 18.

Figure 9:
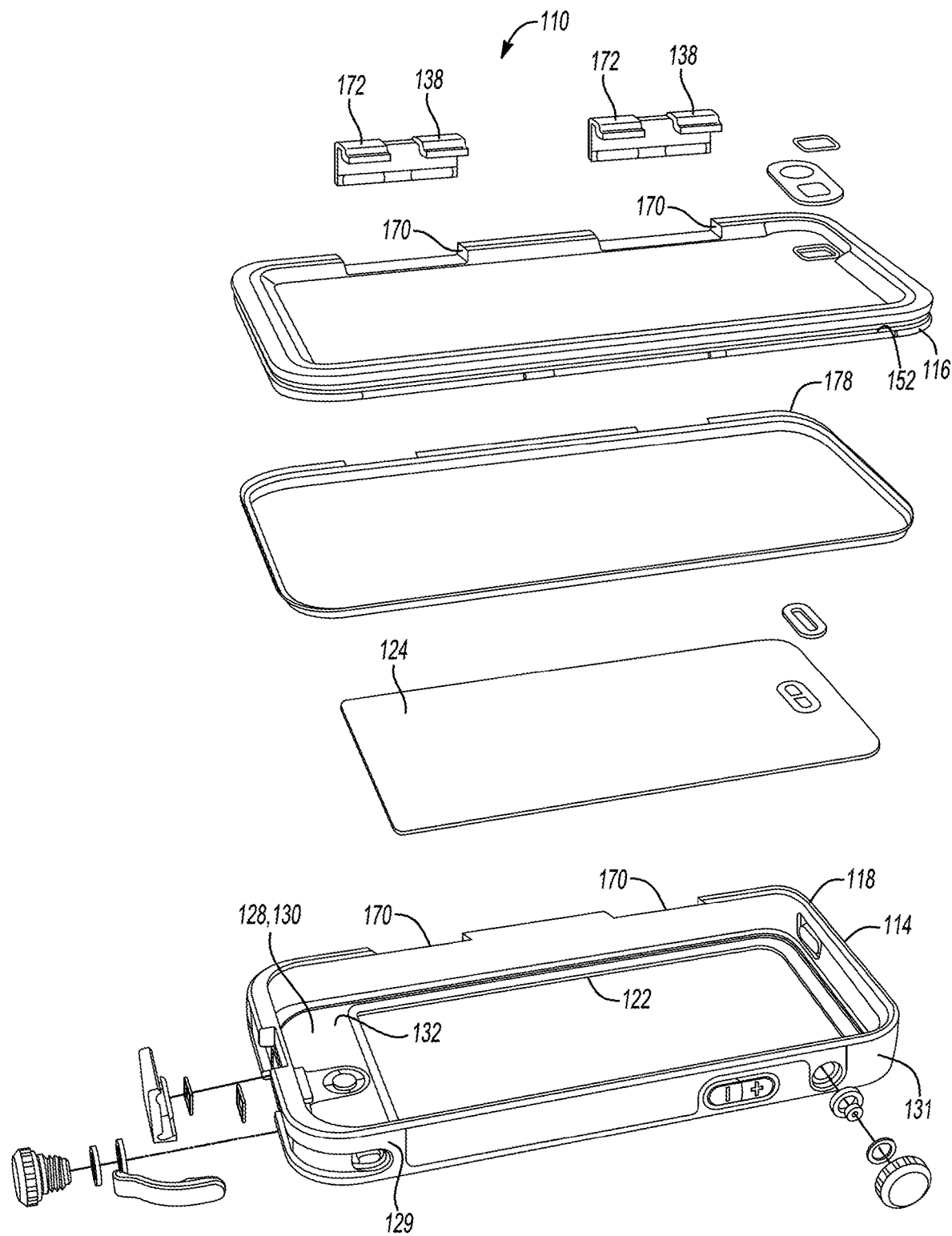
FIG. 9 is an exploded perspective view of a second embodiment of a protective case.

Referring to FIG. 9 there is shown a second embodiment of a protective and waterproof case 110. As with the first embodiment, the protective case 110 includes a main housing 114 and a lid 116. The main housing 114 may include a case member 118. The case member 118 may be formed of various materials to provide a rigid structure for the protective case 110. In one aspect, the case member 118 may be formed of a clear material such as a clear plastic resin. Various plastic resins including polycarbonate may be utilized.

The case member 118 may include various slots and access ports 120 formed therein. The slots and access ports 120 may be used to actuate various functions using buttons or switches and allow sound transmission, as will be described in more detail below. Additionally, the case member 118 may include a window portion 122 formed therein that receives a screen member 124. The case member 118 may include sealing and locating material 126 applied thereon on defined portions of the case member 118, such as about the slots and access ports 120 to provide location and a sealing for the electronic device 112 as well as allow access to various toggles of the electronic device as will be described in more detail below. In one aspect, the sealing and location material 216 may include various plastic elastomers such as a TPE-TPU material or may be formed of other materials.

The case member 118 includes a screen member 124 attached thereon about the window portion 122 of the case member 118. The screen member 124 may be a separate piece attached using various methods including using an adhesive, welding, molding or otherwise attaching the screen member 124. Alternatively, the screen member 124 may be formed with the case member 118 and may have a thickness that is different from other portions of the case member 118. In one aspect, the screen member 124 may be formed of a clear material allowing viewing of a display of the electronic device 112. The screen member 124 may have a thickness that allows a user to manipulate a touch screen of the electronic device 112 through the screen member 124 and allow for transmission of sound. In one aspect, the screen member 124 may extend to an ear piece speaker location allowing the screen resonate and allow more acoustic energy to be transmitted through the screen member 124.

The case member 118 includes at least one sound chamber 128 formed thereon. The at least one sound chamber 128 may be defined by an area of the case member 118 that includes a thinned wall section 130 or wall section that has a smaller thickness than an adjacent portion of the case member 118. The thinned wall section 130 defines an air space 132 allowing for sound to be transmitted to and from speakers and/or microphones of the electronic device 112. In the depicted embodiments of the figures, two sound chambers 128 are defined in a lower portion 129 of the case member 118. It should be realized that various numbers of sound chambers may be present.

In one aspect, the case member 118 also includes at least one secondary sound port 132. In the depicted embodiments a secondary sound ports 132 is formed in the upper portion 131 of the case member 118 and includes a microphone 135. Additionally, the lid 116 may include a second microphone port 139. The secondary sound ports 132 may be defined by slots 134 formed in the case member 118 or lid 116.

Figure 10:
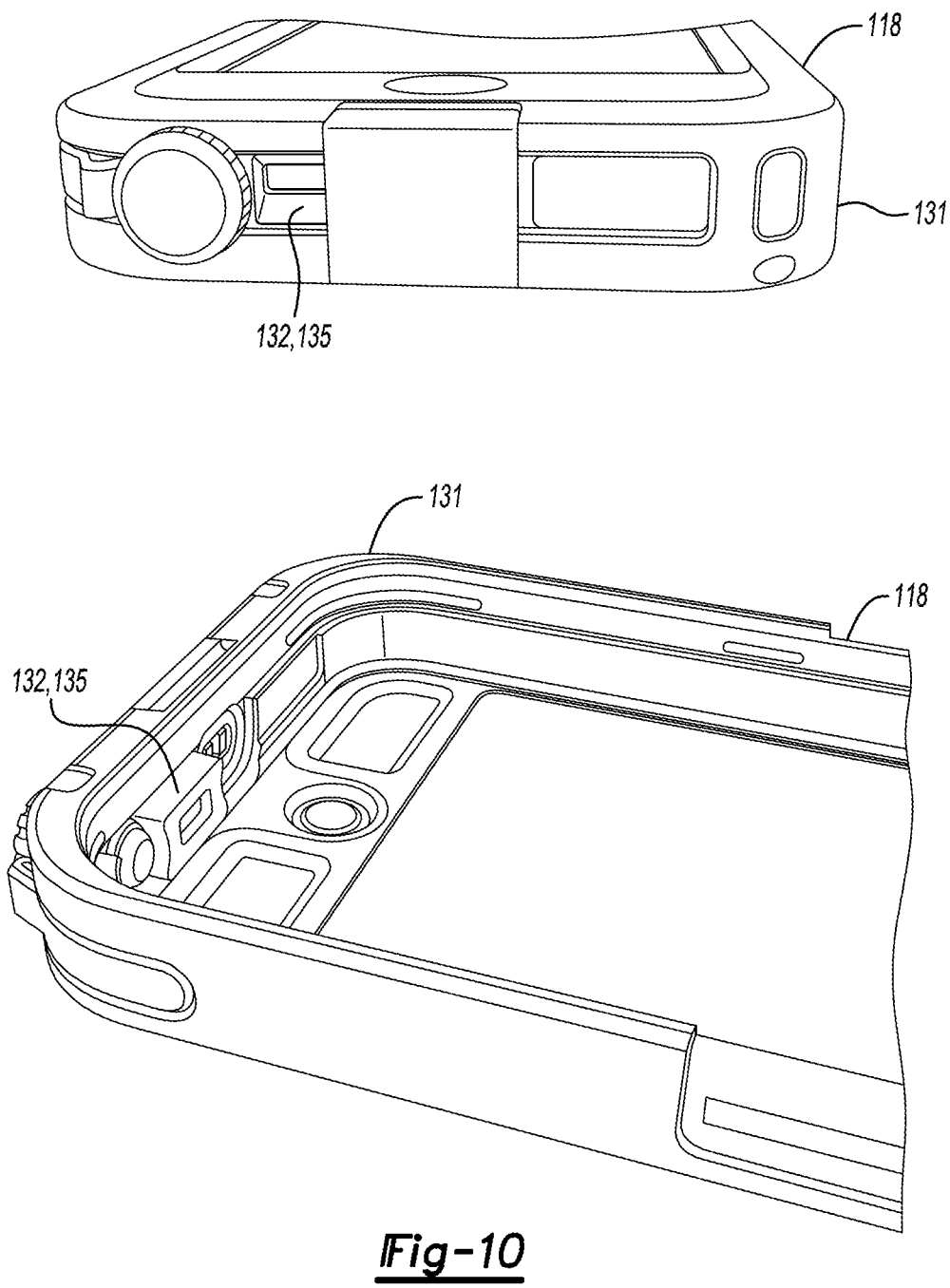
FIG. 10 are perspective views of a microphone port and membrane of the second embodiment.
Figure 11:
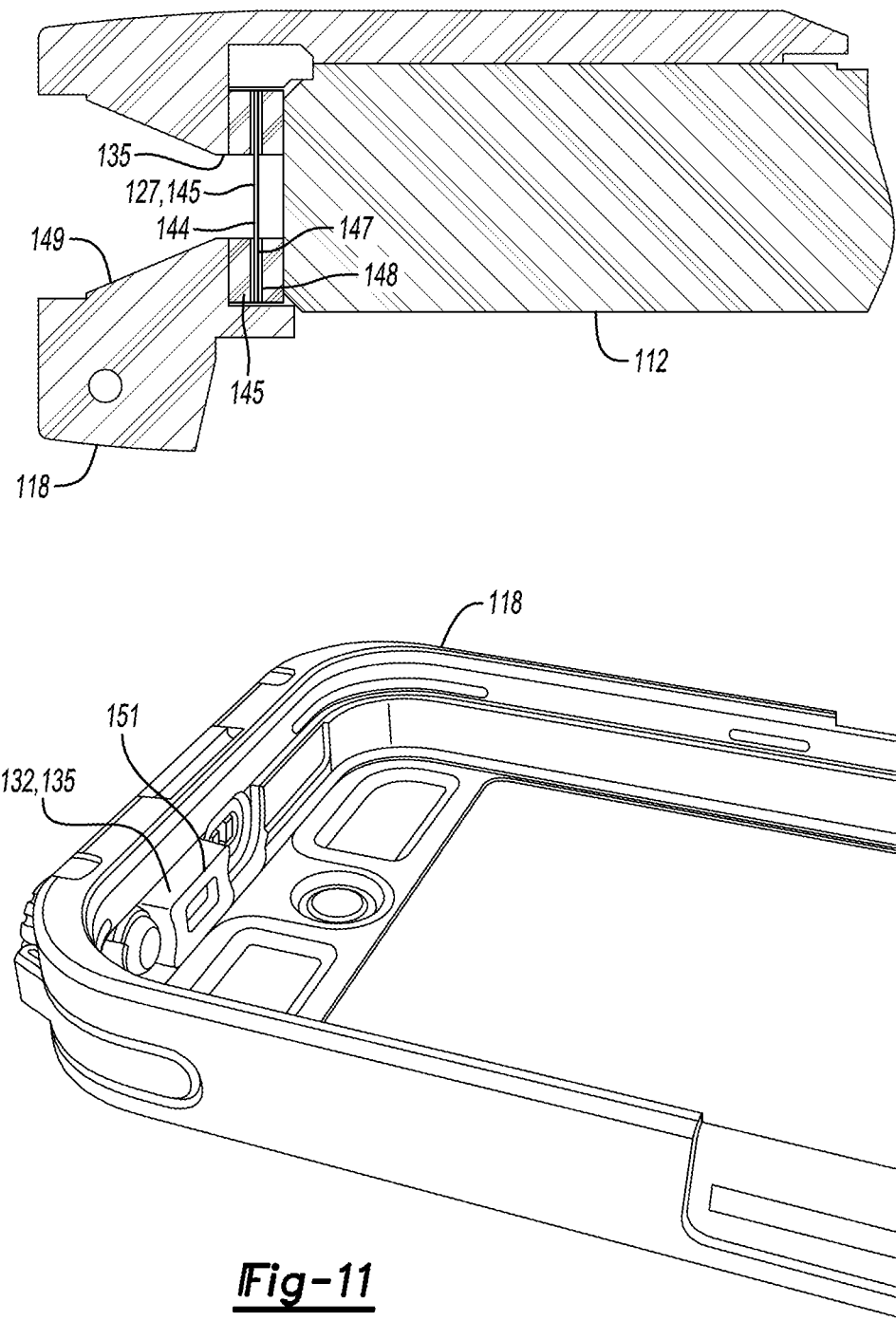
FIG. 11 are a sectional view and perspective view of the membrane assembly of the microphone port of FIG. 10.
Figure 14A:
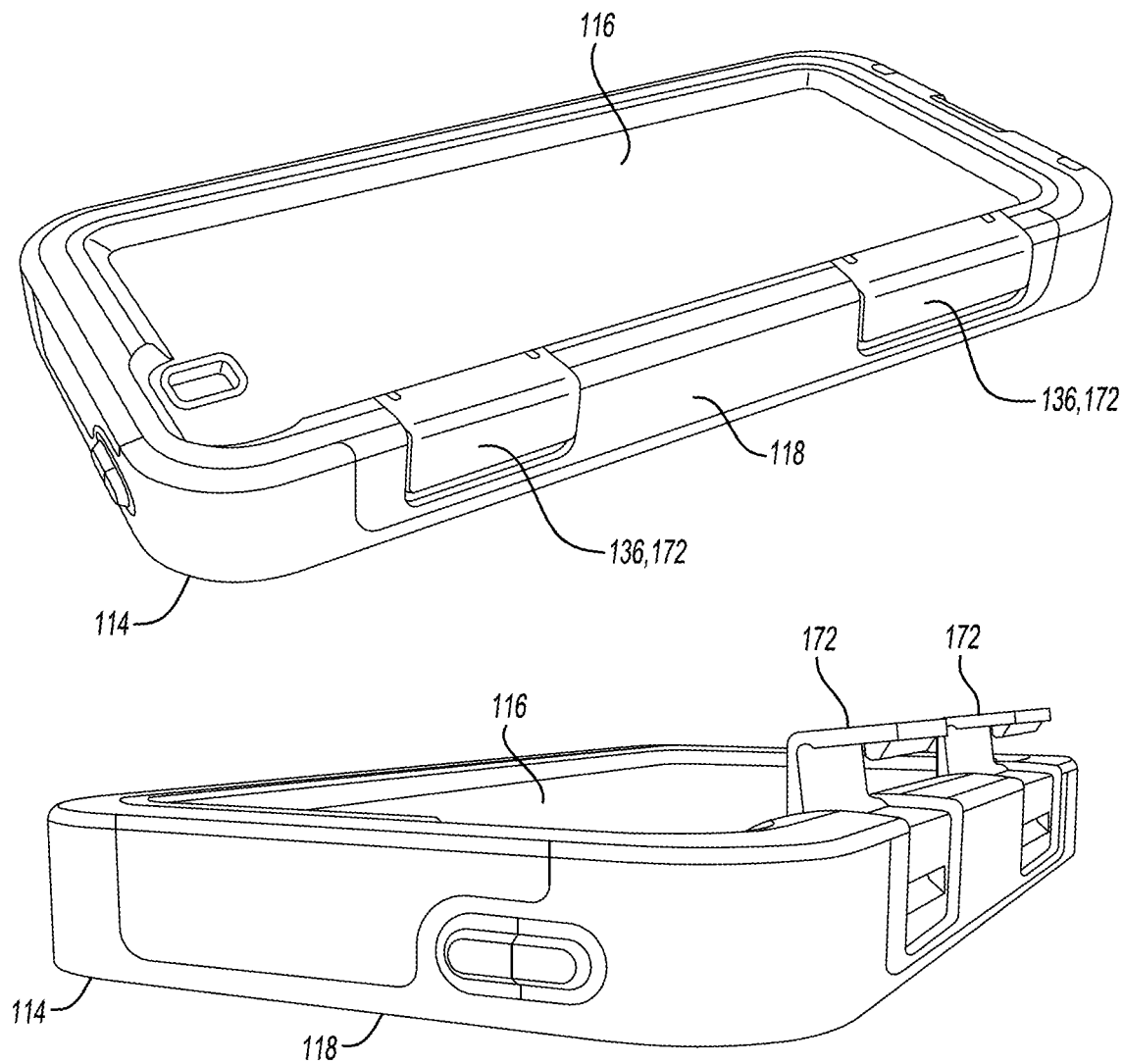
FIGS. 14A and 14B are perspective views of the case and attachment structures of the second embodiment.
Figure 14B:
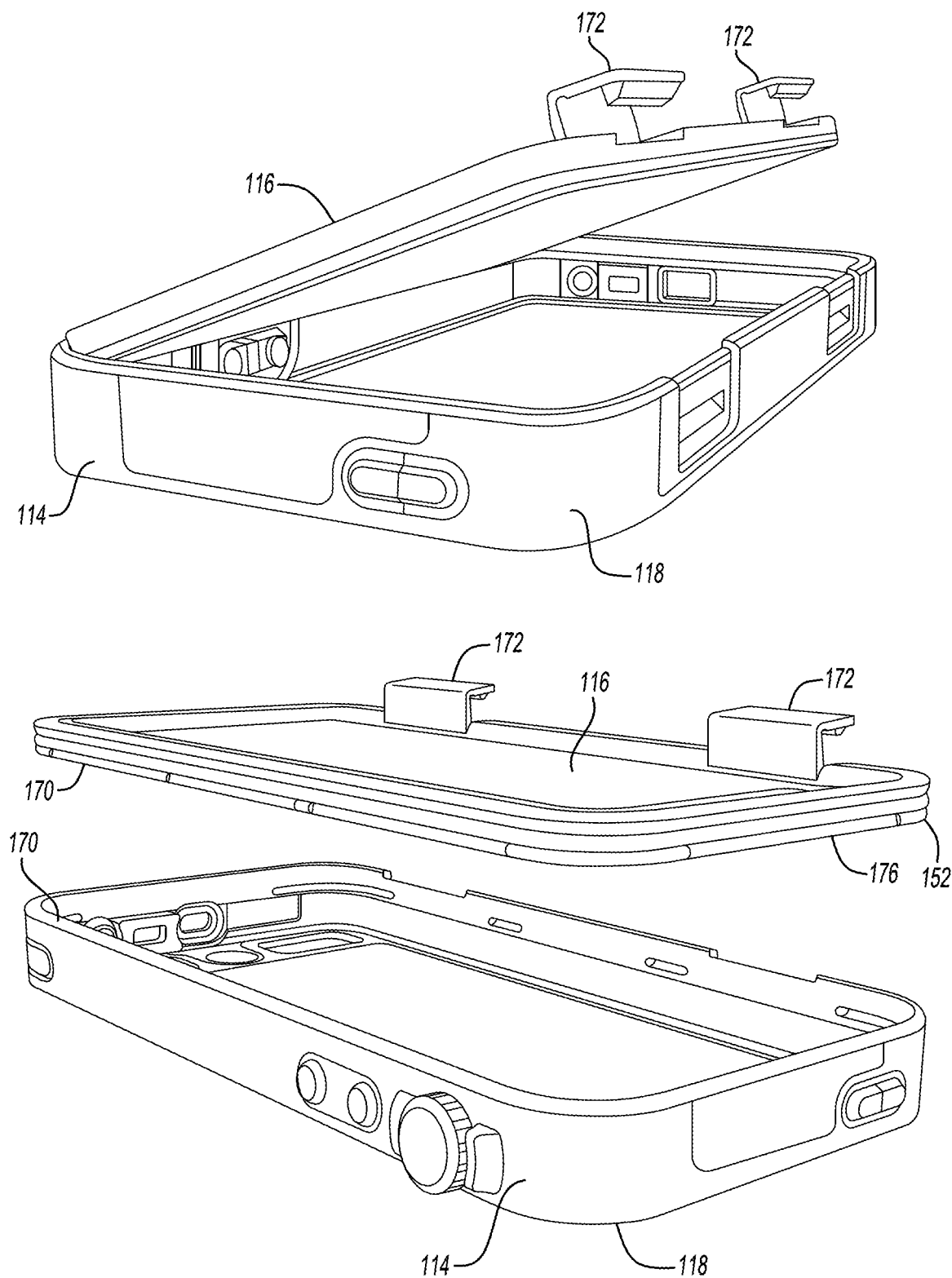
Figure 15:
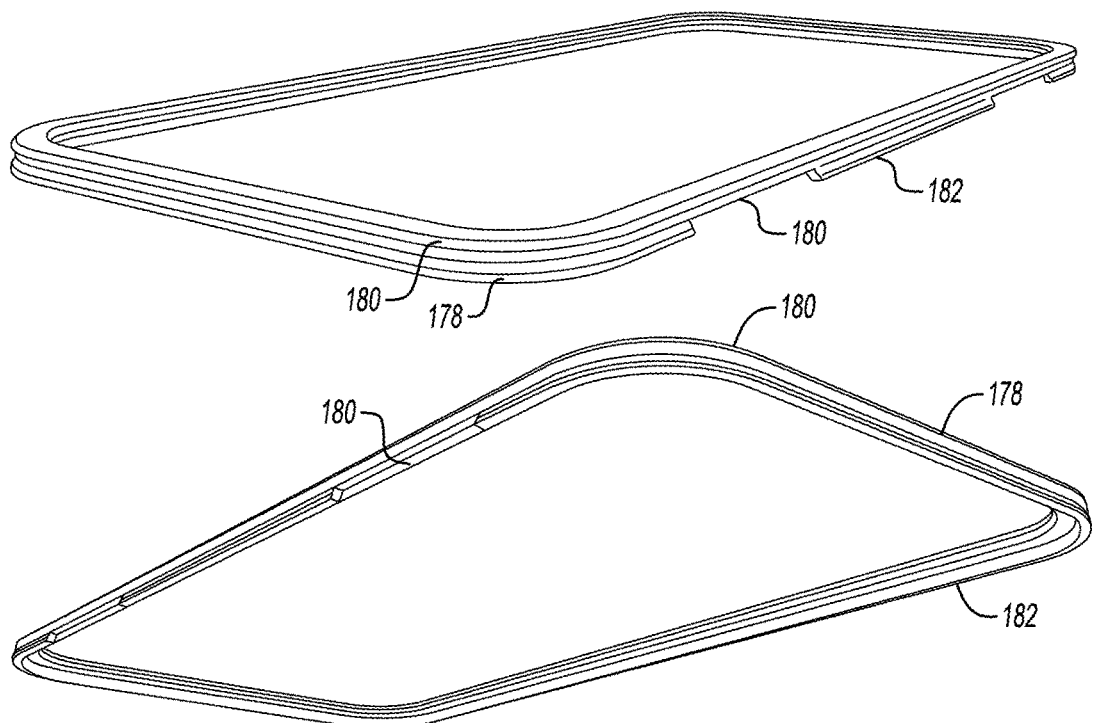
FIG. 15 is a perspective view of a seal of the lid of the second embodiment.
Figure 16A:
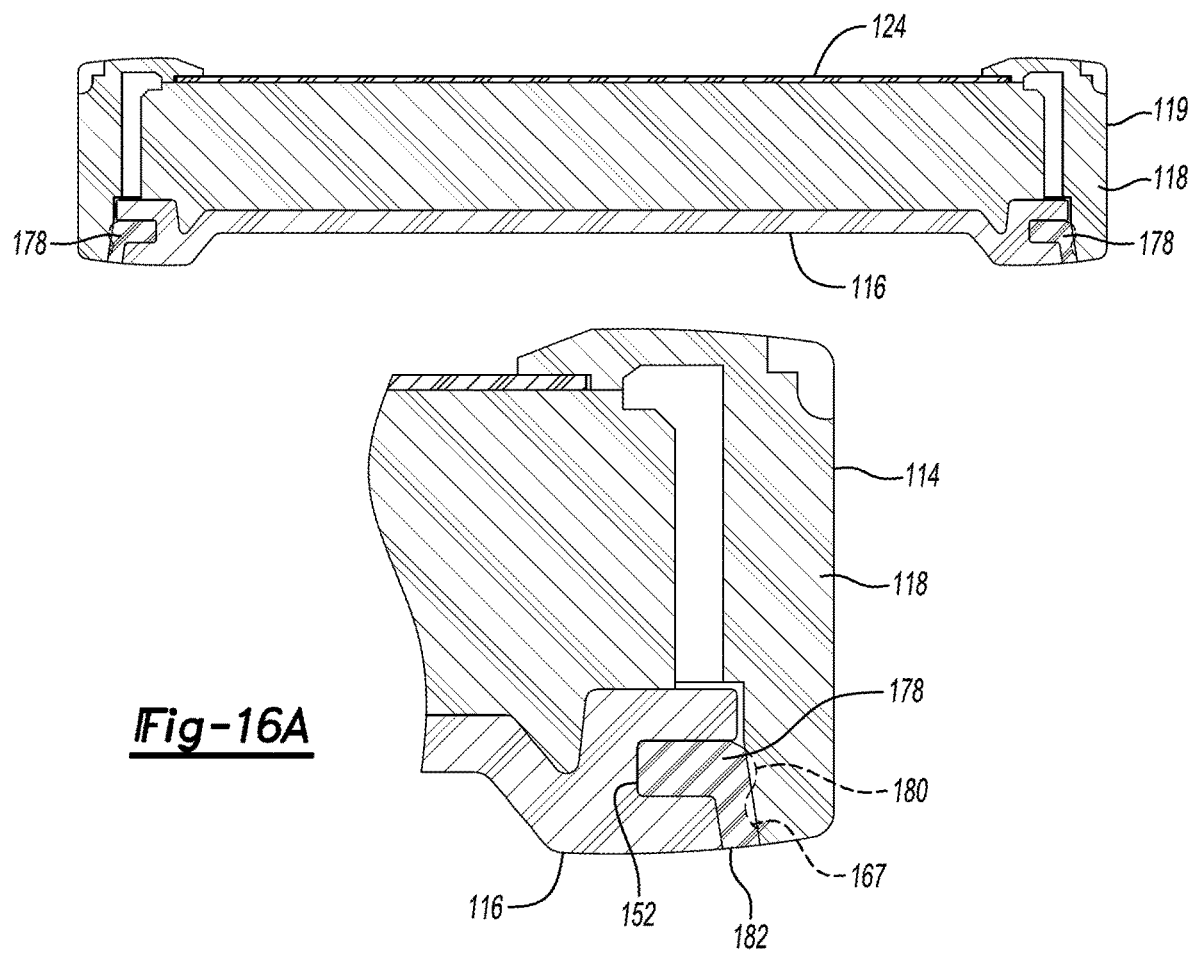
FIGS. 16A and 16B are perspective and sectional views of the case including the lid and main housing and seal of the second embodiment.
Figure 16B:
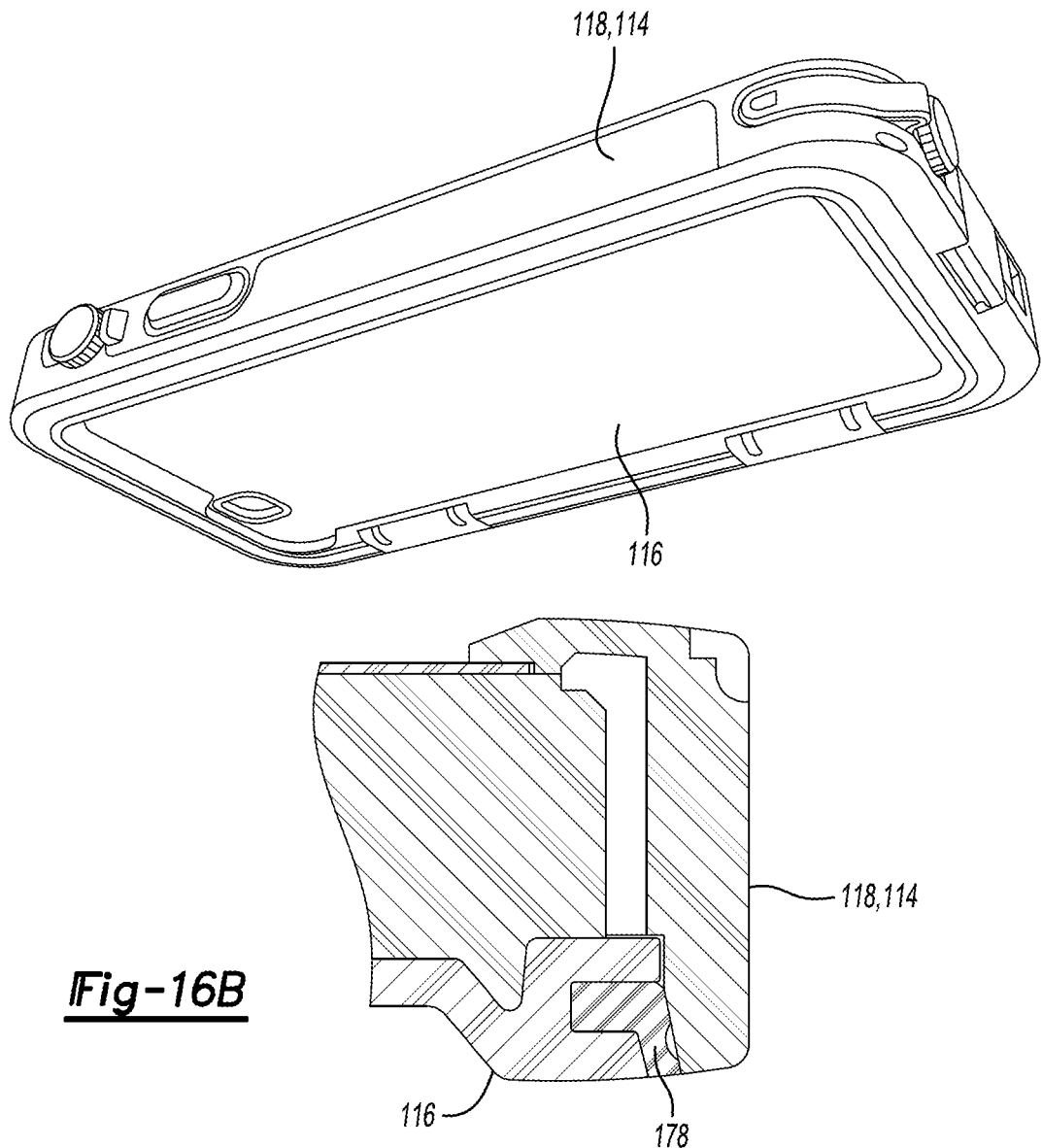

Referring to FIGS. 10-11, the membrane 127 positioned about the microphone port 135 of the device may have a first membrane assembly 143 positioned within the microphone port 135. The membrane assembly 143 may include a membrane 144 of a size and thickness as described above and having the desired material properties as described above to allow for the accurate transmission of sound. In the depicted embodiment, a TPU membrane 144 is attached to foam sections 145 on both side using an appropriate adhesive such as an appropriate double sided adhesive 147 as described above. The membrane assembly 143 is positioned on an inner surface of the case member 118 in the region of the microphone port 135. The foam sections 145 seal the microphone of the device 112 to improve the sound quality as described above and also spaces the membrane 144 to allow it to freely vibrate for an accurate transmission of sound as described above. The microphone port 135 includes a cone shaped channel 149 to direct and amplify sound as it travels to a microphone of the device 112 within the case 110. Additionally, the case member 118 may include a lip or extension 151 from the case member 118 toward an interior of the case member 118. The lip 151 prevents the device 112 positioned within the case 110 from damaging the foam sections 145 such as from a sideways sheering force that may be applied.

Referring to FIGS. 12-13 the second microphone port 139 may be formed in the lid 116. The second microphone port 139 may include a membrane assembly 155 that also functions as a camera and flash isolation structure. The entire membrane assembly 155 may be attached to the lid 116 using an appropriate compliant adhesive as described above such as a 2 mm thick double sided VHB tape to form a water and air tight seal. In the depicted embodiment the lid 116 may include a raised lip 117 to locate the membrane assembly 155. Another raised lip 119 may be defined about the second speaker port 139 to receive a gasket 141 to block light from a camera flash from travelling through the lid 116 or case member 118.

The membrane assembly 155 may include a membrane 161 positioned between foam sections or rubber sections 163. The membrane 161 is formed of a clear TPU material to allow a flash to operate through the membrane 161 and also allow for the transmission of sound. As shown in the figures the membrane 161 is positioned in a cutout section 165 of the foam sections 163. An adjacent cutout section 167 is defined to receive a camera from the electronic device 112. The camera is isolated from the flash that passes through the membrane 161 of the second microphone port 139. The camera operates through the lid material that is positioned below the camera cut out section 167. The foam section cutout 165 for the membrane 161 also includes a notch 169 formed therein to allow acoustic energy to travel to a microphone of the device 112.

Referring to FIGS. 14A-16B, the case member 118 and lid 116 may include attachment structures 138 for joining the main housing 114 with the lid 116. In the depicted embodiments the attachment structures 138 may include hinge features 170 formed in the case member 118 and lid 116 allowing the lid 116 to mate with the case member 118 on one side of the lid 116. On an opposing side latches 172 may be attached that pivot and contact snap fit features 174 on the case member 118 to secure the lid 116 to the case member 118. Additionally secondary snap fit features 176 may be formed on the lid 116 to mate with the case member 118 and securely attach the lid 116 to the case member 118. As can be seen in the figures, a seal 178 is positioned in a groove 152 formed about the edge of the lid 116. The seal 178 includes a sealing edge 180 and a dust skirt lip 182 to prevent dust and other debris from the interior of the case 110. The seal 178 is compressed between the wall 267 of the case member 118 and the groove 152 formed in the lid 116 which receives the seal 178. In one aspect, the seal 178 receives a radial compression between the main housing 114 and the lid 116 to provide a water and air tight seal. The radial compression is defined by the load applied to the seal 178 from the wall 267 of the main housing 114 and the position of the seal 178 in the groove 152 of the lid 116. Additionally the dust lip 182 seals a gap between the lid 116 and case member 118. The seal 178 may include cut out portions 180 to allow the latches 172 to sit flush in the housing 114 when attached.

Figure 17:
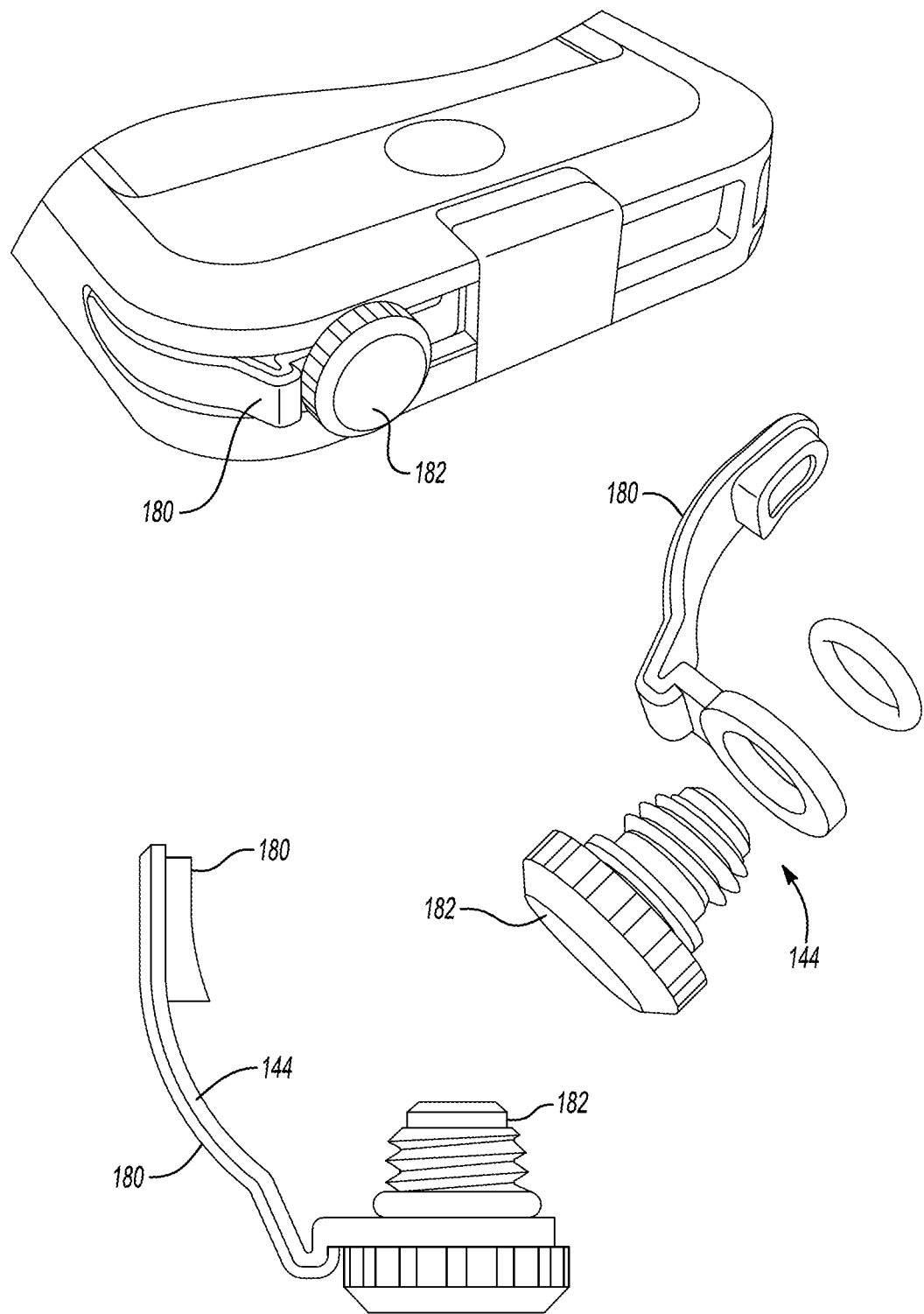
FIG. 17 is a perspective view of the case and plug of the second embodiment.

The case member 118 may include additional structures that allow a user to operate the electronic device 112 with a water and air tight seal. The case member 118 may include a plug 144, best shown in FIG. 17 that is attached to the case member 118. The plug 144 includes an attachment structure 180 for mating with the case member 118 and a plug portion 182. The plug portion 182 may include a threaded core 184 that mates with the head phone slot formed in the housing 114. An O-ring may be positioned about the plug 182 to seal as the plug portion 182 is screwed into the case member 118.

Figure 18:
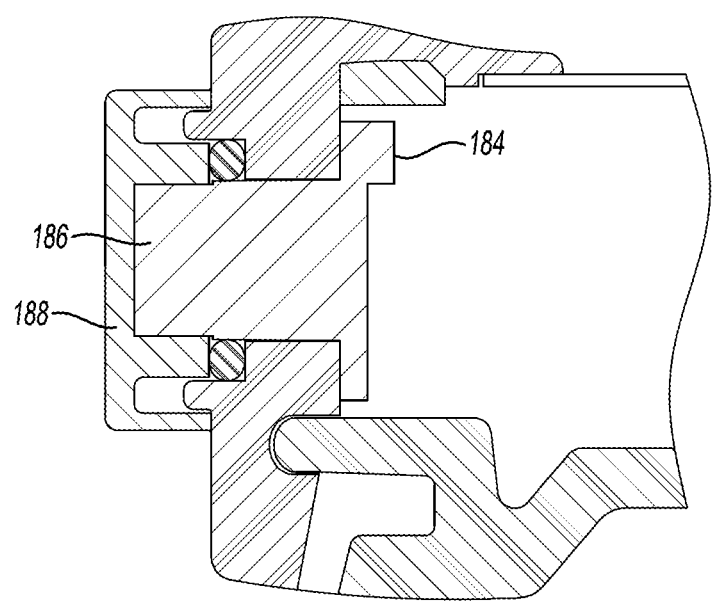
FIG. 18 is a perspective and sectional view of the case and a toggle for actuating a device of the second embodiment.
Figure 18:
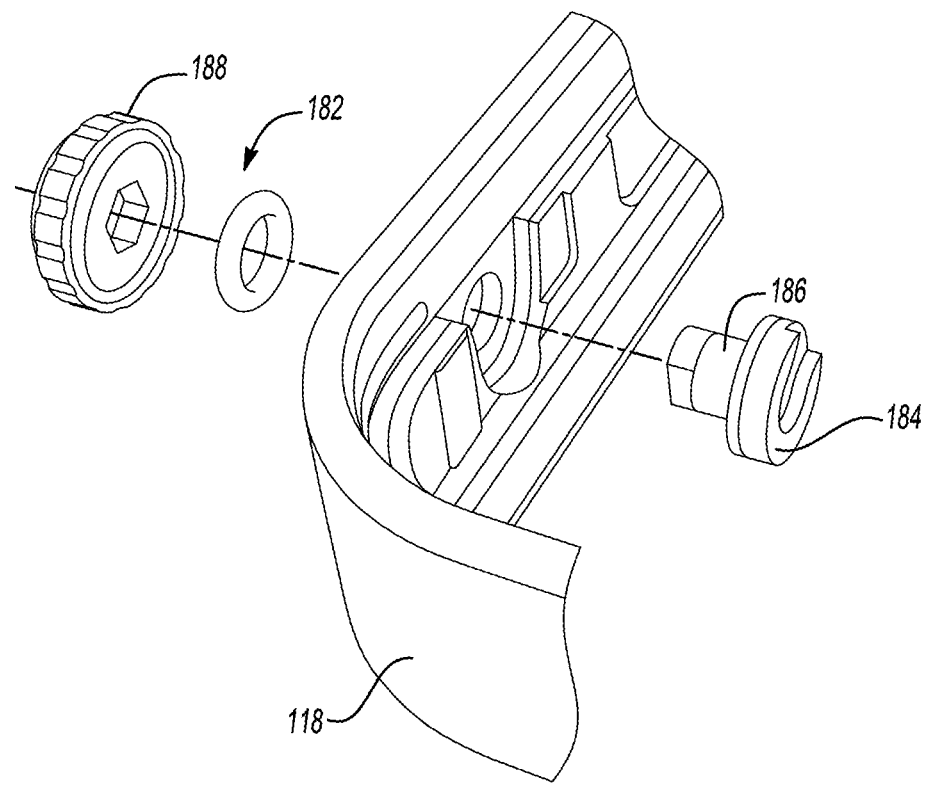
Figure 19:
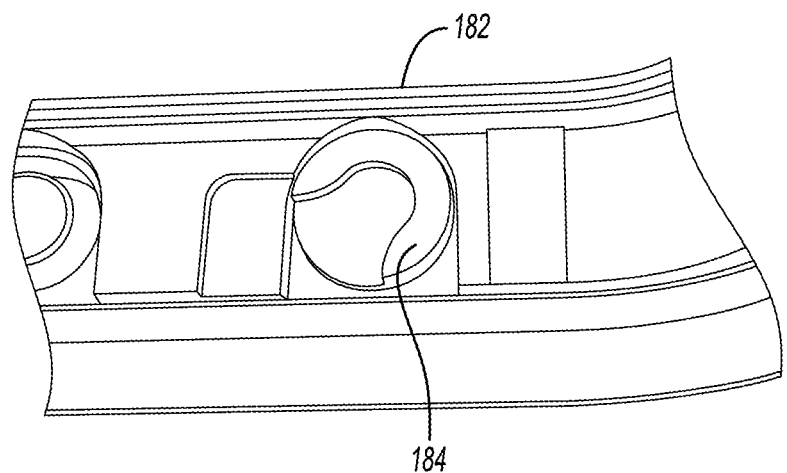
FIG. 19 is a perspective and partial sectional view of the case and a toggle for actuating a device of the second embodiment.
Figure 19:
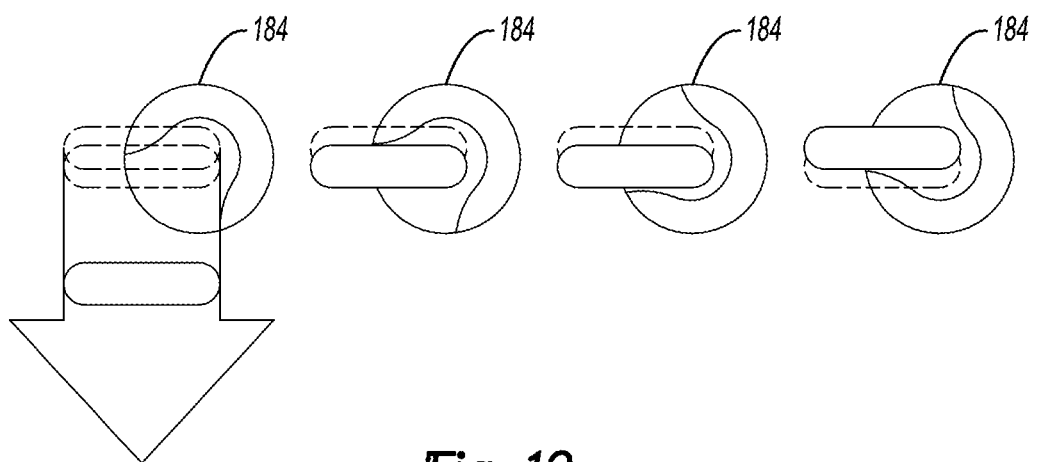
Figure 20:
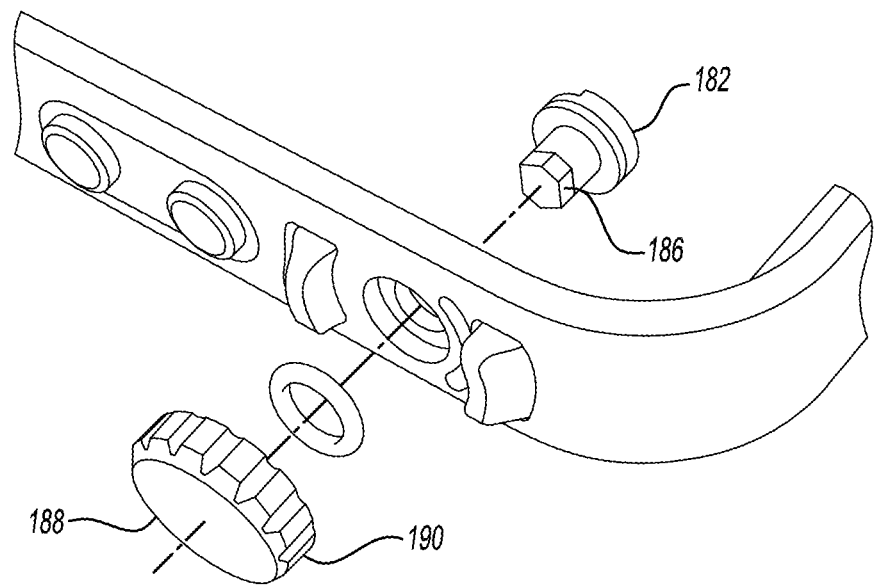
FIG. 20 is a perspective view of the case and a second toggle for actuating a device of the second embodiment.
Figure 20:
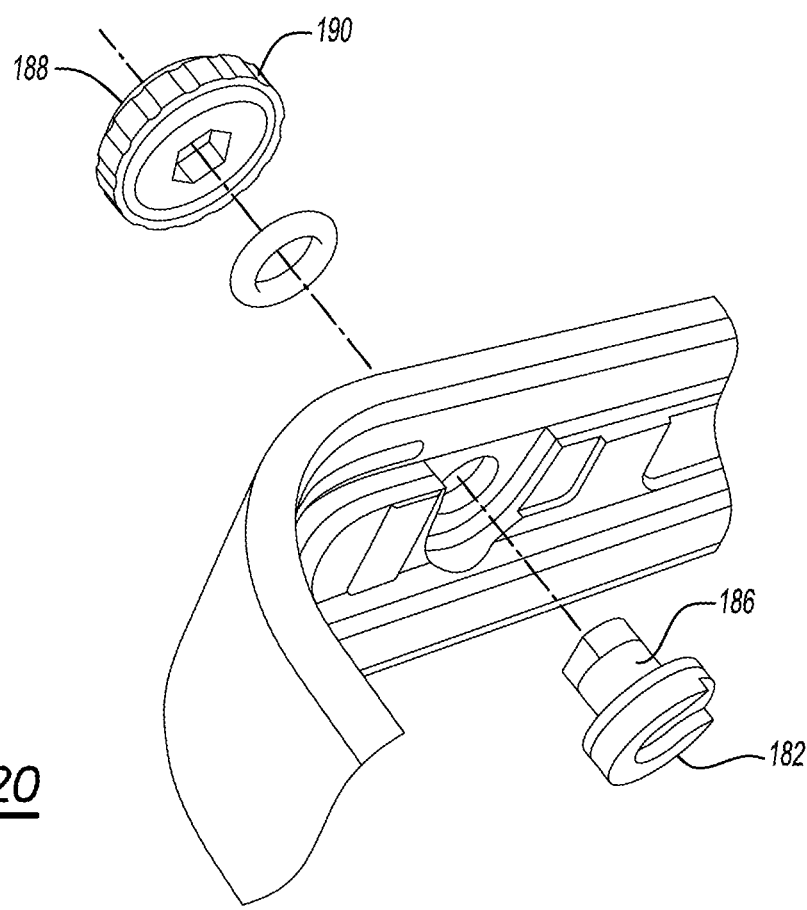

Additionally, the case member 118 may include various toggles 146 to operate buttons or switches associated with the electronic device 112. In the depicted embodiment of FIGS. 18-19, a first toggle 182 may be positioned on the upper portion of the case member 118. The toggle 182 includes an assembly having an actuator having a c shaped contact portion 184 within the case member and a shaft 186 that extends through the slot formed in the case member 118 and is received in a control button 188. The shaft 186 may have O-rings positioned around it to seal the opening in the case member 118 and provide an air and water tight seal. The button 188 may be rotated to cause the C-shaped contact portion 184 to rotate and actuate a switch on the device 112. Another toggle 190, as shown in FIG. 20 may be positioned on the upper side of the case member 118. The toggle 190 may include a similar structure a described above including the button 118, actuator with contact portion 184 and O-ring seal.

Figure 21:
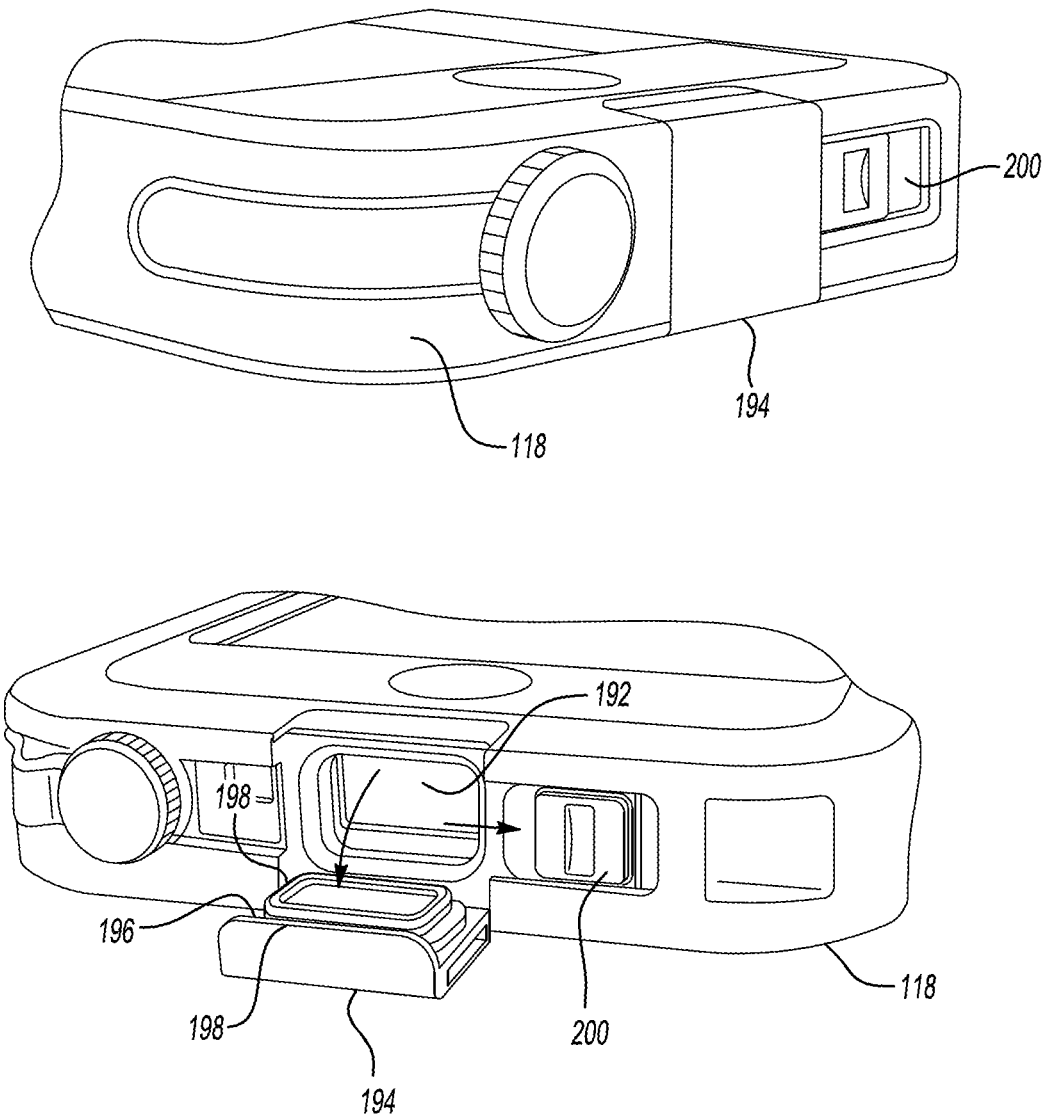
FIG. 21 is a perspective view of the case including an access port of the second embodiment.
Figure 22:
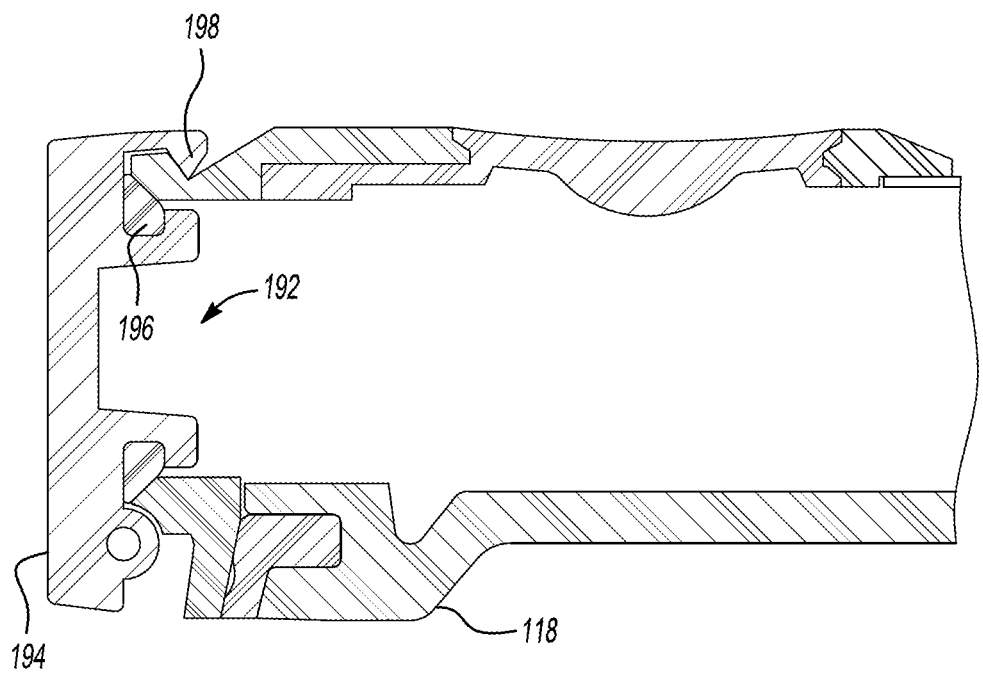
FIG. 22 is a perspective view and sectional view of the case including an access port of the second embodiment.
Figure 22:
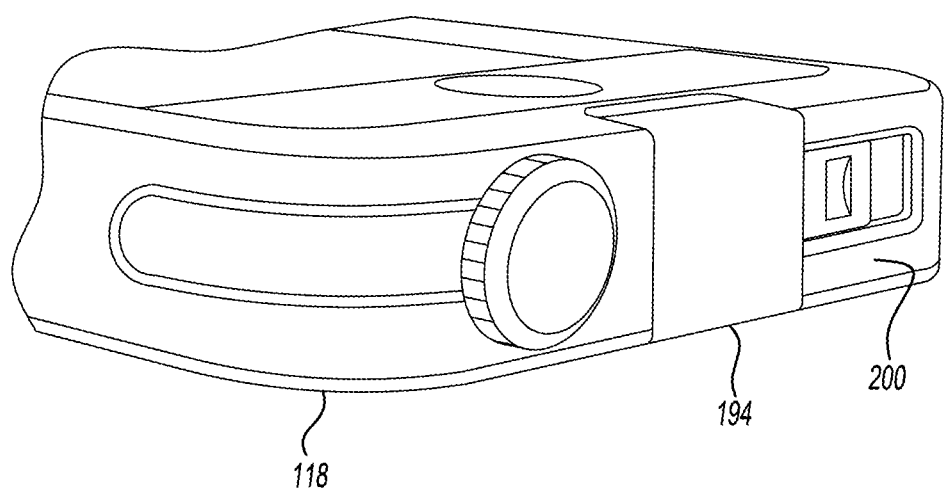

Referring to FIGS. 21-22, the case member 118 may include an access port 192 formed on the upper portion of the case member 118. The access port 192 may be used for charging a device or accessing other parts of the device 112. The access port 192 includes a removably hinged door 194 attached to the case member 118. The hinged door 194 includes a seal or gasket 196 positioned thereon those mates with the case member 118. The hinged door 194 includes snap features 198 formed thereon that mate with the case member 118 to hold the door 194 in place A secondary lock 200 slides within a channel in the case member 118 to move in and out of contact with the door 194 to latch the door 194 to the case member 118. In one aspect, the door may be removed so that accessory devices may be mated with the case 110. For example various accessories such as battery chargers and other devices may include a seal that mates with the case member 118 and latches to the case member 118 may be included.

Figure 24:
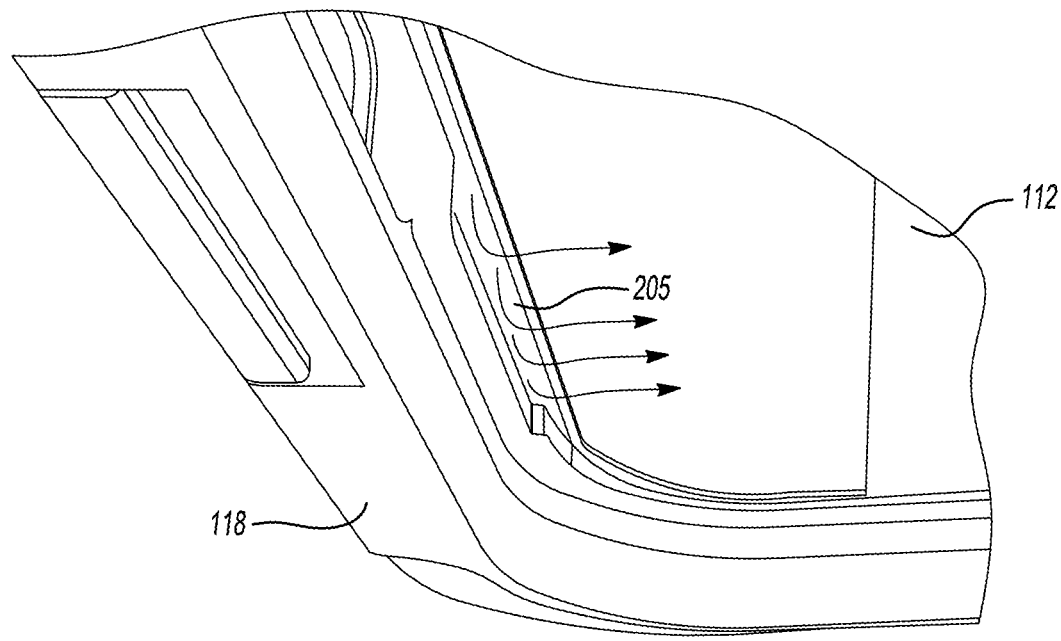
FIG. 24 are perspective views of a case member showing air gaps of the second embodiment.
Figure 24:
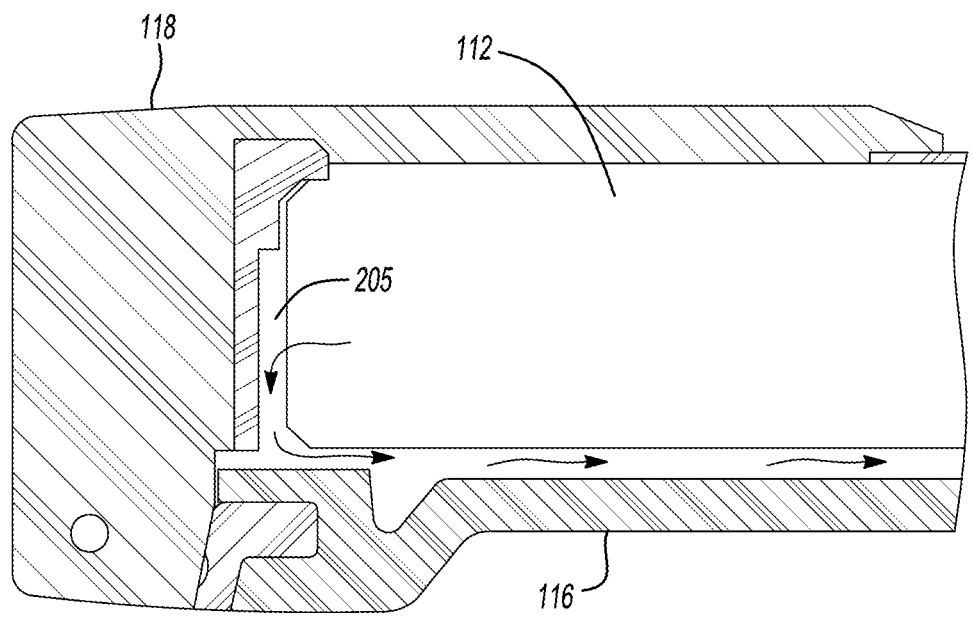
Figure 25:
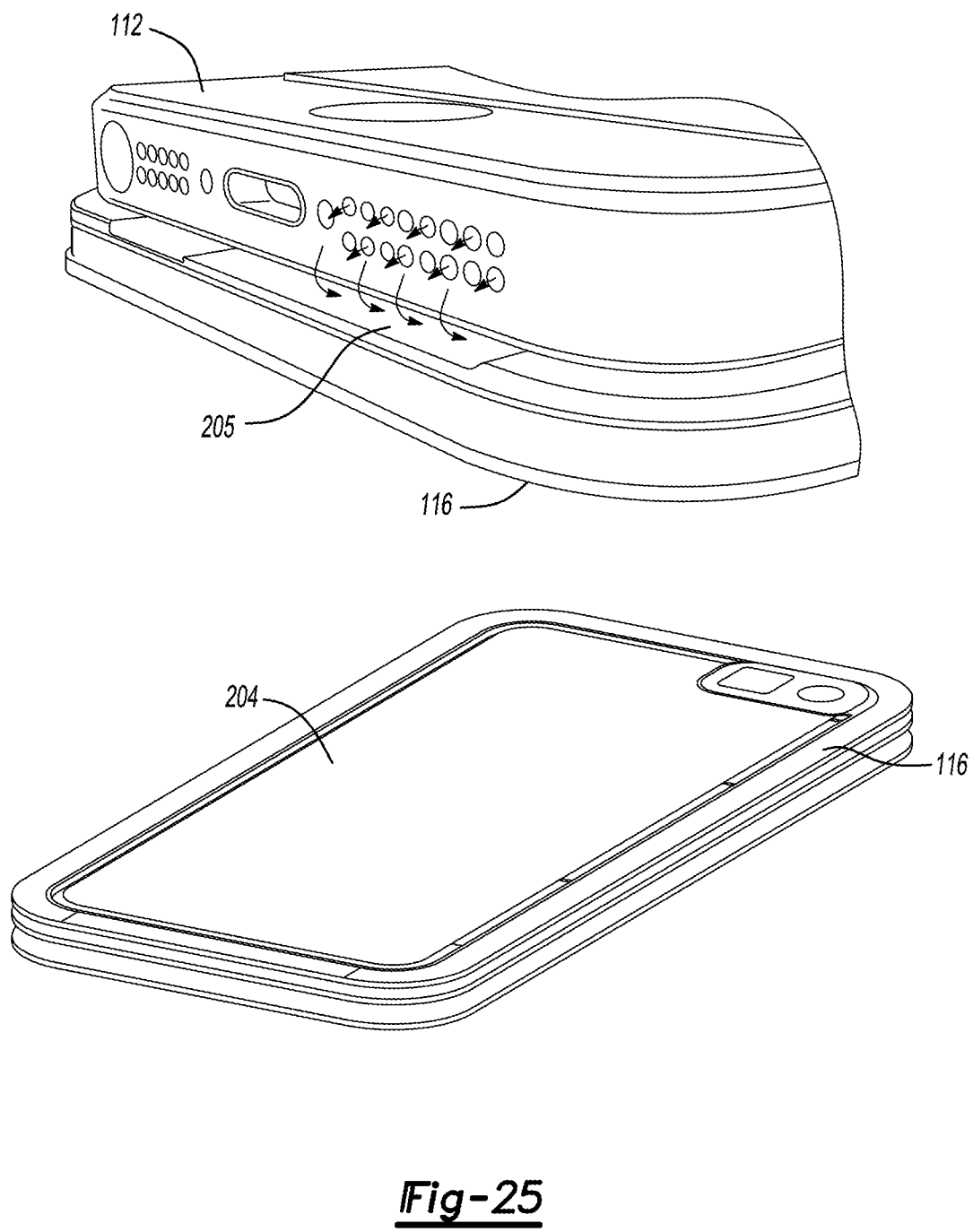
FIG. 25 are perspective views of a case member showing air gaps of the second embodiment.

In one aspect, as shown in FIGS. 24-26, the lid 116 and screen 124 may act as an acoustic membrane 204 to transmit sound out of the case 110. As shown in FIG. 24 the lid 116 is spaced from the device in the case to define an air space or air gap 205. The sound may be redirected through the air cavities and air gaps 205 to allow the air pressure to move to another larger area of the case 110 that can vibrate and act as the speaker membrane 204 to allow sound waves to propagate to the outside of the case. The sound can be redirected in such a way because the case 110 includes non-permeable air tight membranes so that there is minimal loss in acoustic energy as there is little transmission loss of the sound since there are no air vents that would reduce the air pressure and reduce the potential vibrational energy of the membrane. In one embodiment, the structure of the lid may be utilized to act as the acoustic membrane 204. In one aspect as shown in FIG. 26 the lid 116 may include a cut out portion 210 that may have a thinner piece of material compliantly mounted therein to act as the membrane 204. Various sized cutouts 210 may be utilized with various sized membranes 204 applied over the cut out 210. The membrane material may be the same or different from the lid 116. Alternatively the lid 116 may be formed as one piece and act as the acoustic membrane 204. In such an embodiment the lid 116 may have a thickness and size which in combination with the air gap 205 allows the lid to resonate and transmit sound.

The screen 124 may also act as an acoustic membrane in combination with an air gap 205 as best shown in FIG. 24. As with the lid 116, the screen may have a thickness and size in conjunction which in combination with the air gap 205 allows the screen 124 to resonate and transmit sound The invention has been described in an illustrative manner. It is therefore to be understood that the terminology used is intended to be in the nature of words of description rather than of limitation. Many modifications and variations of the invention are possible in light of the above description. Thus, within the scope of the appended claims, the invention may be practiced or applied other than as specifically described.

We claim:

1. A protective case for an electronic device, the protective case comprising:
   a main housing;
   the main housing being shaped to receive an electronic device, said electronic device including a switch;
   the main housing including a slot formed therein and positioned proximate the switch of the electronic device when the electronic device is positioned in the main housing, the main housing including a pair of separated raised walls formed thereon about the slot, each wall of the pair of separated raised walls being positioned contiguous to the slot, and a toggle rotatively positioned within the slot and between the raised walls, the toggle including a circular body and a button attached to a shaft that extends through the slot, the button located on an exterior of the main housing and rotatable to actuate the toggle, the toggle further including at least two raised contact portions being formed on and extending from the circular body and arranged such that the switch is positioned between the raised contact portions and is actuable by rotation of the toggle.

2. The protective case for an electronic device of claim 1 wherein the at least two raised contact portions are positioned within the main housing, the shaft extending to the circular body.

3. The protective case for an electronic device of claim 1 further including an O-ring positioned about the shaft, the O-ring providing an air and water tight seal relative to the slot.

4. The protective case for an electronic device of claim 1 wherein at least one of the pair of separated raised walls includes a partial circular profile about the slot.

5. The protective case for an electronic device of claim 1 wherein the raised walls surround a portion of the button.

6. The protective case for an electronic device of claim 1 wherein the pair of separated raised walls are formed by a recess in the exterior of the main housing, the button being positioned within the recess.

* * * * *